US012781949B2

(12) United States Patent
Liu et al.

(10) Patent No.: US 12,781,949 B2
(45) Date of Patent: Nov. 3, 2026

(54) ILLUMINATION ANGLE ADJUSTMENT COMPONENT AND ANGLE-ADJUSTABLE LUMINAIRE

(71) Applicant: Huizhou CDN Industrial Development Co., Ltd., Huizhou (CN)

(72) Inventors: Baolin Liu, Huizhou (CN); Jun Xiong, Huizhou (CN); Zhiyan Ye, Huizhou (CN); Yang Zhou, Huizhou (CN); Shi Chen, Huizhou (CN)

(73) Assignee: Huizhou CDN Industrial Development Co., Ltd., Huizhou (CN)

( * ) Notice: Subject to any disclaimer, the term of this patent is extended or adjusted under 35 U.S.C. 154(b) by 0 days.

(21) Appl. No.: 19/171,374

(22) Filed: Apr. 7, 2025

(65) Prior Publication Data

US 2026/0063286 A1 Mar. 5, 2026

(30) Foreign Application Priority Data

Aug. 30, 2024 (CN) ......................... 202422134563.1
Nov. 30, 2024 (CN) ......................... 202411749749.6

(51) Int. Cl.

*F21V 21/30* (2006.01)
*F21V 17/10* (2006.01)
*F21V 17/16* (2006.01)
*F21V 23/02* (2006.01)
*F21V 29/70* (2015.01)
*F21V 23/00* (2015.01)
*F21Y 115/10* (2016.01)

(52) U.S. Cl.

CPC ............ *F21V 21/30* (2013.01); *F21V 17/105* (2013.01); *F21V 17/164* (2013.01); *F21V 23/02* (2013.01); *F21V 29/70* (2015.01); *F21V 23/001* (2013.01); *F21Y 2115/10* (2016.08)

(58) Field of Classification Search

CPC ........ F21V 21/30; F21V 29/70; F21V 17/105; F21V 17/164; F21V 23/02; F21V 23/001; F21Y 2115/10

See application file for complete search history.

(56) References Cited

U.S. PATENT DOCUMENTS 10,247,390 B1 * 4/2019 Kopitzke, IV ........ F21V 23/001
10,697,599 B1 * 6/2020 Davis ........................ F21V 21/30
10,830,423 B2 * 11/2020 Fujisawa ................. F21V 21/30
2008/0055907 A1 * 3/2008 Bruckner ................ F21V 11/06 362/290
2014/0252249 A1 * 9/2014 Doros ..................... F21V 14/06 362/311.1
2022/0090763 A1 * 3/2022 Orsman .................. F21V 14/02

* cited by examiner

*Primary Examiner* — Bao Q Truong
(74) *Attorney, Agent, or Firm* — OPENPTO US LLC; Yuhao Liang

(57) ABSTRACT

The invention provides an illumination angle adjustment component and an angle-adjustable luminaire. The illumination angle adjustment component comprises a support, a light source and an optical component. The light source emits light that is at least partially incident on the optical component, and the light is re-directed and emitted through the optical component. The light source and the optical component are both mounted on the support, and at least one of the light source and the optical component is rotatable and/or swingable relative to the support to change an angle of emergence of the light emitted from the optical component. The illumination angle adjustment component can improve the universality and ensure the heat dissipation effect.

19 Claims, 24 Drawing Sheets

ILLUMINATION ANGLE ADJUSTMENT COMPONENT AND ANGLE-ADJUSTABLE LUMINAIRE

TECHNICAL FIELD

The present invention relates to the field of luminaires, particularly to an irradiation angle adjustment component and an angle-adjustable luminaire.

BACKGROUND

A luminaire is a general term for a lighting tool, referring to a device that can transmit, distribute, and alter the light distribution of a light source. It includes all components necessary for fixing and protecting the light source, excluding the light source itself. If the luminaire has an adjustable illumination angle, an angle of emergence of the light source can be changed. For example, the Chinese invention patent application with application number CN201110052821.6, its lamp head and lamp base are connected by a rotating shaft, which allows the lamp head to rotate relative to the lamp base. Another example is the Chinese utility model patent application with application number CN201420145780.4, its LED light engine is connected to the lamp ring by an angle adjustment structure, which allows the lamp head to rotate relative to the lamp ring. Another example is the Chinese utility model patent application with application number CN201920589831.5, its light emitting component is mounted on a rotating frame, which is connected to the fixed component by rotation, allowing the lamp head to rotate relative to the fixed component. Another example is the Chinese utility model patent application with application number CN202021270779.6, its lamp head is connected to the lamp ring structure by a rotating ring, allowing the lamp head to rotate relative to the lamp ring. Another example is the Chinese invention patent application with application number CN202010486414.5, its lamp head is connected to the mounting frame by rotation, allowing the lamp head to rotate relative to the mounting frame. Another example is the Chinese utility model patent application with application number CN202321484018.4, its light source is connected to the outer ring by rotation through the inner ring and the middle ring, allowing the lamp head to rotate relative to the lamp ring.

The above-mentioned luminaires are all designed with a rotatable or swingable lamp head relative to the face ring or other structures used to fix the lamp head to the ceiling. This allows the light source to be directed in different directions. The lamp head typically includes a heat sink, LED beads, a lamp board, and optical components, resulting in a relatively large overall spatial volume. In cases where the installation space is limited, it is impossible to reserve sufficient space for the lamp head to rotate or swing, which can lead to interference and reduce the adjustable range of illumination angle of the lamp head, resulting in poor versatility. If the heat sink is adjusted to reduce the overall volume of the lamp head, such as in the case of a trunk lamp, its heat dissipation performance will be significantly affected, which in turn will affect the service life of the luminaire.

SUMMARY

The purpose of the present invention is to overcome the shortcomings of the prior art and provide a universal irradiation angle adjustment component and an angle-adjustable luminaire that can improve the universality of the irradiation angle adjustment component while ensuring the heat dissipation effect.

The purpose of the present invention is achieved by the following technical solutions.

An illumination angle adjustment component, comprises a support, a light source and an optical component, wherein the light source emits light that is at least partially incident on the optical component, and the light is re-directed and emitted through the optical component;

the light source and the optical component are both mounted on the support, and at least one of the light source and the optical component is rotatable and/or swingable relative to the support to change an angle of emergence of the light emitted from the optical component.

In one embodiment, the light source is rotatably and/or swingably connected to the support, and the optical component is mounted on the support;

or, the light source is mounted on the support, and the optical component is rotatably and/or pivotally connected to the support;

or, the light source and the optical component are independently rotatably and/or swingably connected to the support.

In one embodiment, the light source is rotatably and/or swingingly connected to the support, and the optical component is mounted on the support.

In one embodiment, the light source and the optical component are independently rotatably and/or swingably connected to the support.

In one embodiment, the irradiation angle adjustment component further comprises a connection part and an adjustment part, the light source is connected to the connection part on a side closer to the optical component, the adjustment part is disposed on the connection part and the support, and at least one of the connection part and the support is rotatably and/or swingably connected to the adjustment part to change an angle of incidence of the light entering the optical component.

In one embodiment, the connection part is a plastic connection part.

In one embodiment, the adjustment part is a plastic adjustment part.

In one embodiment, the adjustment part is a bolt or a shaft, one end of the adjustment part is connected to the connection part, the other end of the adjustment part is rotatably connected to the support, and the adjustment part is located on a periphery of the light source.

In one embodiment, a first arcuate groove is provided on a side wall of the adjustment part, the first arcuate groove extends away from the optical component and extends along a circumferential direction of the light source, a portion of the support is slidably connected to the first arcuate groove and rotatably connected to the adjustment part, and the adjustment part is connected to the connection part.

In one embodiment, the adjustment part is a bolt or a shaft, one end of the adjustment part is connected to the support, the other end of the adjustment part is rotatably connected to the connecting member, and the adjustment part is located on a periphery of the light source.

In one embodiment, a second arcuate groove is provided on a side wall of the connection part, the second arcuate groove extends away from the optical component and extends along the circumferential direction of the light source, and a portion of the adjustment part is slidably connected to the second arcuate groove and rotatably connected to the connection part.

In one embodiment, a side wall of the adjustment part protrudes with a first rotating rod, the first rotating rod is rotatably connected to the support, the first rotating rod is offset from the optical component, and the first rotating rod is located on a periphery of the light source; an outer wall of the connection part protrudes with a second rotating rod, the light source is exposed to at least one end wall of the connection part, the second rotating rod is rotatably connected to the adjustment part, and a rotation axis of the adjustment part intersects a rotation axis of the connection part.

In one embodiment, a side wall of the adjustment part protrudes with a first rotating rod, the first rotating rod is rotatably connected to the support, the first rotating rod is offset from the optical component, and the first rotating rod is located on a periphery of the light source; an outer wall of the connection part protrudes with a second rotating rod, the light source is exposed to at least one end wall of the connection part, the second rotating rod is rotatably connected to the adjustment part, and a rotation axis of the adjustment part intersects a rotation axis of the connection part.

In one embodiment, the adjustment part and the connection part are magnetically connected.

In one embodiment, the connection part is snap-fitted to the adjustment part.

In one embodiment, the connection part is provided with a first wedge-shaped section, the light source is connected to the first wedge-shaped section, the first wedge-shaped section is set towards the optical component;

the connection part is rotatably connected to the adjustment part, and a rotation axis of the connection part is parallel to a height direction of the first wedge-shaped section.

In one embodiment, the connection part is provided with a first gear, the first gear is arranged circumferentially around the connection part;

the irradiation angle adjustment component comprises an auxiliary adjustment part, the auxiliary adjustment part is rotatably connected to the adjustment component, a rotation axis of the auxiliary adjustment part is parallel to a rotation axis of the connection part; the auxiliary adjustment part is provided with a second gear, the second gear is arranged circumferentially around the auxiliary adjustment part; the first gear and the second gear are meshed; and the auxiliary adjustment part projects at least partially from the support.

In one embodiment, the light source is mounted on the support, and the optical component is rotatably and/or swingingly connected to the support.

In one embodiment, the irradiation angle adjustment component further comprises a fixing part and a regulating part, the optical component penetrates through the fixing part and is fixed to the fixing part, the regulating part is disposed on the fixing part and the support, and at least one of the fixing part and the support is rotationally and/or swingably connected to the regulating part, so as to change the angle of emergence of the light emitted from the optical component.

In one embodiment, the fixing part is a plastic fixing part.

In one embodiment, the regulating part is a plastic regulating part.

In one embodiment, the regulating part is a bolt or a rotating shaft; one end of the regulating part is connected to the fixing part, and the other end of the regulating part is rotatably connected to the support; and the regulating part is located on a periphery of the optical component.

In one embodiment, a third arcuate groove is provided on a side wall of the regulating part; the third arcuate groove extends away from the light source and extends along the circumferential direction of the optical component; and the support is partially slidably connected to the third arcuate groove and is rotatably connected to the regulating part.

In one embodiment, an arcuate groove is provided on a side wall of the fixing part; the arcuate groove extends away from the light source and extends along the circumferential direction of the optical component; and the regulating part is slidably connected to the arcuate groove and rotatably connected to the fixing part.

In one embodiment, an outer wall of the regulating part protrudes with a third rotating rod, which is rotatably connected to the support, offset from the light source, and located on the periphery of the optical component; an outer wall of the fixing part protrudes with a fourth rotating rod; the optical component is exposed at two end walls of the fixing part; the fourth rotating rod is rotatably connected to the regulating part; and a rotation axis of the regulating part intersects with a rotation axis of the fixing part.

In one embodiment, the connection part is provided with a second wedge-shaped section; the optical component is exposed on the second wedge-shaped section; the second wedge-shaped section is set away from the light source; the connection part is rotatably connected to the regulating part; and the rotation axis of the connection part is parallel to a height direction of the second wedge-shaped section.

In one embodiment, the fixing part is provided with a third spherical surface, which is offset from the optical component;

the regulating part is provided with a fourth spherical surface, which is offset from the light source; and the fourth spherical surface is attached to the third spherical surface, so that the regulating part is movable relative to the fixing part.

In one embodiment, the regulating part is provided with a beam channel; the light passes through the beam channel; the fourth spherical surface is an annular concave spherical surface, which is located on an inner wall of the regulating part and communicates with the beam channel;

the fixing part is an annular fixing part; the third spherical surface is an annular convex spherical surface, which is located on an outer wall of the annular fixing part and is in contact with the annular concave spherical surface; the annular fixing part is rotatably connected to the fixing part with a center of the sphere of the annular convex spherical surface as a rotation point; the optical component is connected to an inner wall of the annular fixing part; and the optical component is sealed in the beam channel.

In one embodiment, the regulating part and the fixing part are magnetically connected.

In one embodiment, the fixing part is snap-fitted to the regulating part.

In one embodiment, the optical component comprises a lens.

In one embodiment, the optical component comprises a honeycomb grid and/or an accessory ring; the lens, the honeycomb grid and the accessory ring are stacked in sequence, and the honeycomb grid and the accessory ring are both located on a side of the lens away from the light source.

An angle-adjustable luminaire, comprises a drive power supply and an illumination angle adjustment component according to any one of the above embodiments, wherein the drive power supply is electrically connected to the light source.

Compared to the prior art, the present invention has at least the following advantages.

The irradiation angle adjustment component of the present invention irradiation angle adjustment component allows the light source to emit light, the light at least partially entering the optical component, so that the light is redirected and emitted through the optical component. At least one of the light source and the optical component is rotatable and/or swingable relative to the support, thereby changing the angle of emergence of the light emitted from the optical component, so that the adjustment of the irradiation angle is achieved by rotating and/or swinging the optical component and the light source relative to the support. Without adjusting the volume of the heat sink, that is, ensuring the heat dissipation effect, the space required for rotation and/or swing to realize the irradiation angle adjustment is effectively reduced, making it applicable to angle-adjustable luminaires, and better improving the universality of angle-adjustable luminaires.

BRIEF DESCRIPTION OF THE DRAWINGS

In order to more clearly illustrate the technical solutions of the embodiments of the present invention, a brief introduction to the drawings used in the embodiments will be given below. It should be understood that the following drawings only show certain embodiments of the present invention, and therefore should not be considered as a limitation of the scope. For those skilled in the art, other related drawings can be obtained without creative effort based on these drawings.

DESCRIPTION OF THE EMBODIMENTS

Figure 1:
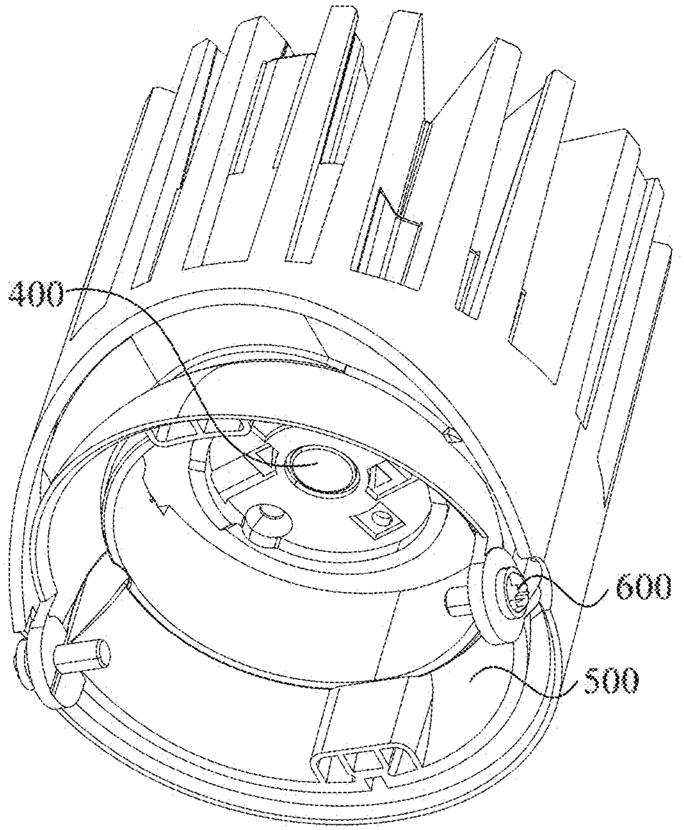
FIG. 1 is a partial view of an irradiation angle adjustment component according to the first embodiment of the present invention.

In order to facilitate the understanding of the present invention, a more comprehensive description will be provided below with reference to the relevant drawings. The drawings illustrate a preferred embodiment of the present invention. However, the present invention can be implemented in many different forms and is not limited to the embodiments described herein. On the contrary, the purpose of providing these embodiments is to make the disclosure of the present invention more thorough and comprehensive.

It should be noted that when a component is referred to as "fixed to" another component, it can be directly on the other component or there may be an intervening component. When a component is considered to be "connected to" another component, it may be directly connected to the other component or there may be an intervening component. The terms "vertical", "horizontal", "left", "right" and similar expressions used in this document are for illustrative purposes only and do not represent the only possible implementation.

Unless defined otherwise, all technical and scientific terms used herein have the same meaning as commonly understood by one of ordinary skill in the art to which this invention belongs. The terminology used in the specification of the present invention is for the purpose of describing particular embodiments only and is not intended to be limiting. The term(s) used herein "and/or" include any and all combinations of one or more of the associated listed items.

The present application provides an irradiation angle adjustment component. The irradiation angle adjustment component comprises a support, a light source, and an optical component. The light source emits light, the light is at least partially incident on the optical component, and is re-directed and emitted by the optical component. The light source and the optical component are both mounted on the support, and at least one of the light source and the optical component is rotatable and/or swingable relative to the support to change an angle of emergence of the light emitted from the optical component.

The irradiation angle adjustment component allows the light source to emit light, the light at least partially entering the optical component, so that the light is re-directed and emitted through the optical component. At least one of the light source and the optical component is rotatable and/or swingable relative to the support, thereby changing the angle of emergence of the light emitted from the optical component, so that the adjustment of the irradiation angle is achieved by rotating and/or swinging the optical component and the light source relative to the support. Without adjusting the volume of the heat sink, that is, ensuring the heat dissipation effect, the space required for rotation and/or swing to realize the irradiation angle adjustment is effectively reduced, making it applicable to angle-adjustable luminaires, and better improving the universality of angle-adjustable luminaires.

It should be noted that, especially when the light source and the optical component are rotated synchronously, the rotation and/or swing of the optical component can be achieved in a smaller reserved space, and a relatively large range of the irradiation angle adjustment can be ensured.

In order for better understanding of the irradiation angle adjustment component according to the present application, a further explanation of the irradiation angle adjustment component is provided below.

Referring to FIGS. 27, 28, 29, 30, 31, 32, and 33, the irradiation angle adjustment component 10 in one embodiment includes a support 800, a light source 400, and an optical component 300. The light source 400 emits light that is at least partially incident to the optical component 300, and the light is re-directed and emitted through the optical component 300. The light source 400 and the optical component 300 are both mounted on the support 800, and at least one of the light source 400 and the optical component 300 can rotate and/or swing relative to the support 800 to change the angle of emergence of the light emitted from the optical component 300.

The irradiation angle adjustment component 10 makes the light source 400 emit light to be at least partially incident to the optical component 300, so as to re-direct and emit the light through the optical component 300. At least one of the light source 400 and the optical component 300 can rotate and/or swing relative to the support 800 to change the angle of emergence of the light emitted from the optical component 300, so that in the process of adjusting the irradiation angle, only the optical component 300 and the light source 400 are rotated and/or swung relative to the support 800, without adjusting the volume of the heat sink, that is, on the basis of ensuring the heat dissipation effect, effectively reduces the space required for rotation and/or swing when realizing the irradiation angle adjustment, making it applicable to angle-adjustable luminaires, and better improves the universality of angle-adjustable luminaires.

In some embodiments, the light source is at least a structure capable of converting electrical energy into light energy, such as LED beads integrated with a lamp plate, etc., for emitting light. Further, the light source also includes a heat sink, and the lamp plate is in contact with the heat sink.

It is understood that at least one of the light source and the optical component can rotate and/or swing relative to the support, specifically including the following three schemes.

In some embodiments, the light source is rotatably and/or swingably connected to the support, and the optical component is mounted on the support.

Alternatively, in other embodiments, the light source is mounted on the support, and the optical component is rotatably and/or swingably connected to the support.

Alternatively, in other embodiments, the light source and the optical component are independently rotatable and/or swingably connected to the support.

The following is a further explanation of each scheme.

Below describes the scheme where the light source is rotatably and/or swingably connected to the support.

It should be noted that, by rotating or swinging the light source relative to the support, the light source ultimately swings relative to the support, changing the angle of incidence to the optical component of the light emitted from the light source. Furthermore, the light source ultimately swings 360° relative to the support.

Referring to FIGS. 1 to 14, in some embodiments, the irradiation angle adjustment component 10 further includes a connection part 500 and an adjustment part 600. The light source 400 is connected to the connection part 500 on a side closer to the optical component 300, the adjustment part 600 is disposed on the connection part 500 and the support 800, and at least one of the connection part 500 and the support 800 is rotatably and/or swingably connected to the adjustment part 600 to change the incident angle of the light entering the optical component 300.

In some embodiments, the connection part is a plastic connection part. Furthermore, the adjustment part is a plastic adjustment part.

Referring to FIGS. 1 to 4, in some embodiments, the adjustment part 600 is mounted on the connection part 500, and the adjustment part 600 is rotatably and/or swingably connected to the support 800.

In the first embodiment, referring to FIG. 1, the adjustment part 600 is a bolt. One end of the adjustment part 600 is connected to the connection part 500, the other end of the adjustment part 600 is rotatably connected to the support 800, and the adjustment part 600 is located on a periphery of the light source 400.

Figure 2:
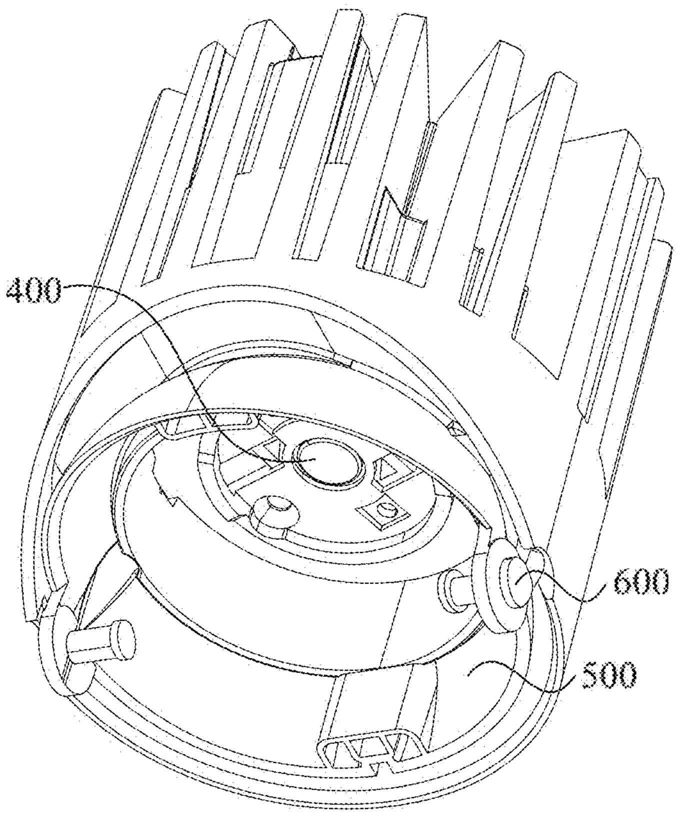
FIG. 2 is a partial view of an irradiation angle adjustment component according to the second embodiment of the present invention.

In the second embodiment, referring to FIG. 2, the adjustment part 600 rotates around an axis, one end of the adjustment part 600 is connected to the connection part 500, the other end of the adjustment part 600 is rotatably connected to the support 800, and the adjustment part 600 is located on a periphery of the light source 400.

Figure 3:
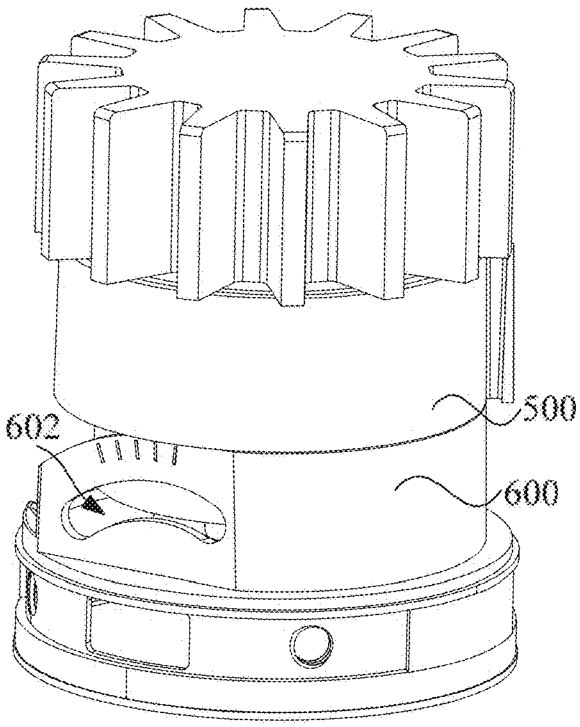
FIG. 3 is a partial view of an irradiation angle adjustment component according to the third embodiment of the present invention.
Figure 4:
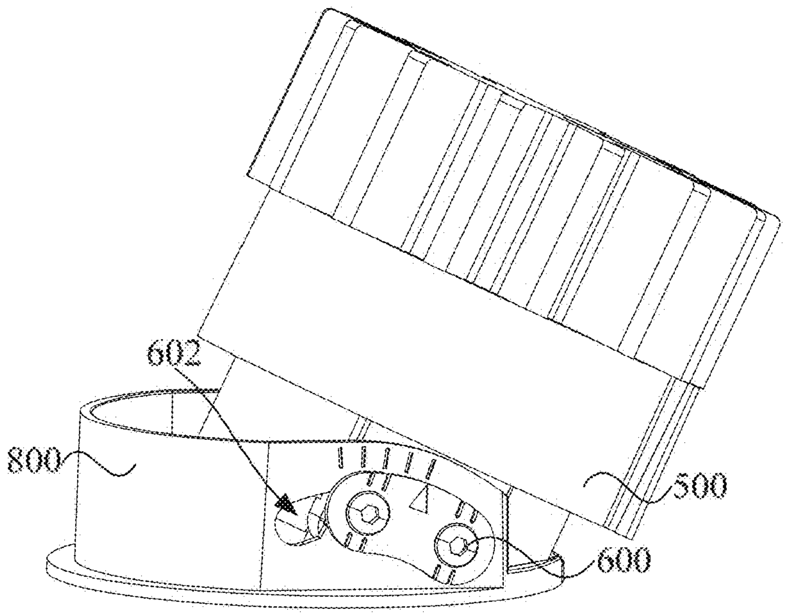
FIG. 4 is a partial view of another irradiation angle adjustment component according to the third embodiment of the present invention.

In the third embodiment, referring to FIG. 3, a first arcuate groove 602 is provided on a side wall of the adjustment part 600. The first arcuate groove 602 extends in a direction away from the optical component 300, and extends along a circumferential direction of the light source 400. A portion of the support 800 is slidably connected to the first arcuate groove 602 and rotatably connected to the adjustment part 600. Referring to FIG. 4, it can be understood that, the first arcuate groove 602 can also be defined on the support 800, and a portion of the adjustment part 600 is slidably connected to the first arcuate groove 602 and rotatably connected to the support 800.

Referring to FIGS. 5 to 13, in some embodiments, the adjustment part 600 is rotatably and/or swingably connected to the connection part 500, and the adjustment part 600 is mounted on the support 800.

Figure 5:
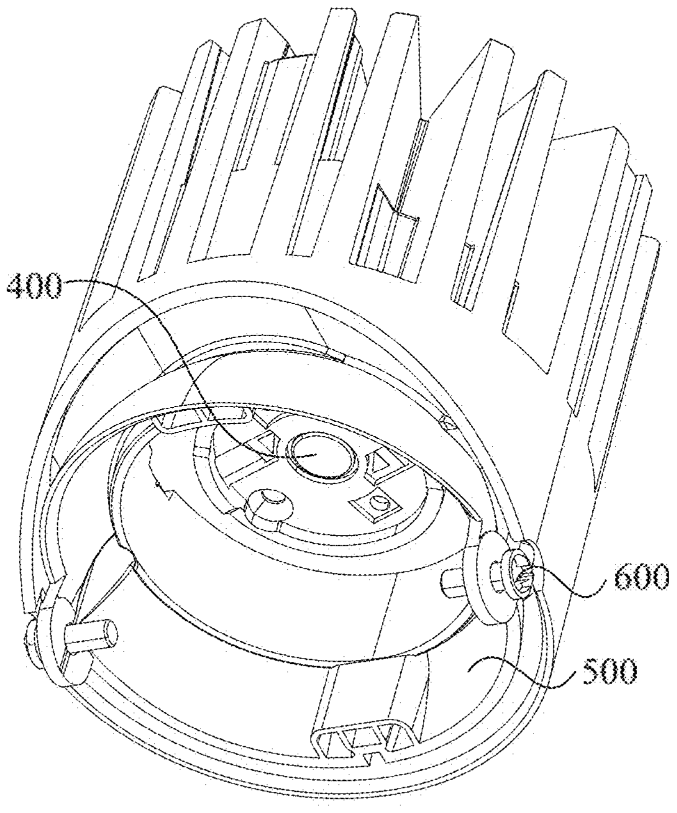
FIG. 5 is a partial view of an irradiation angle adjustment component according to the fourth embodiment of the present invention.

In the fourth embodiment, referring to FIG. 5, the adjustment part 600 is a bolt; one end of the adjustment part 600 is connected to the support 800, the other end of the adjustment part 600 is rotatably connected to the connection part 500; and the adjustment part 600 is located on the periphery of the light source 400.

Figure 6:
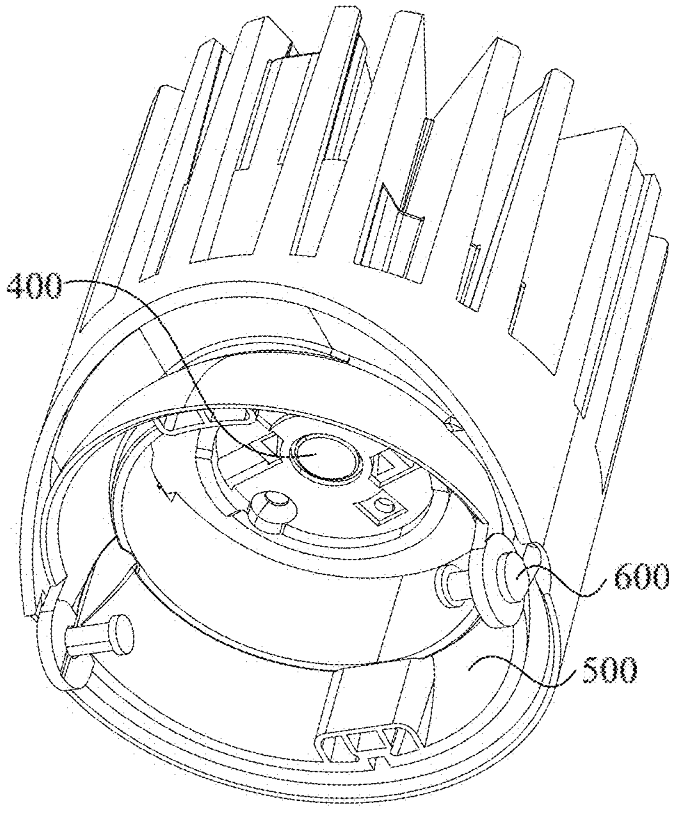
FIG. 6 is a partial view of an irradiation angle adjustment component according to the fifth embodiment of the present invention.

In the fifth embodiment, referring to FIG. 6, the adjustment part 600 is a rotating shaft; one end of the adjustment part 600 is connected to the support 800, the other end of the adjustment part 600 is rotatably connected to the connection part 500; and the adjustment part 600 is located on the periphery of the light source 400.

Figure 7:
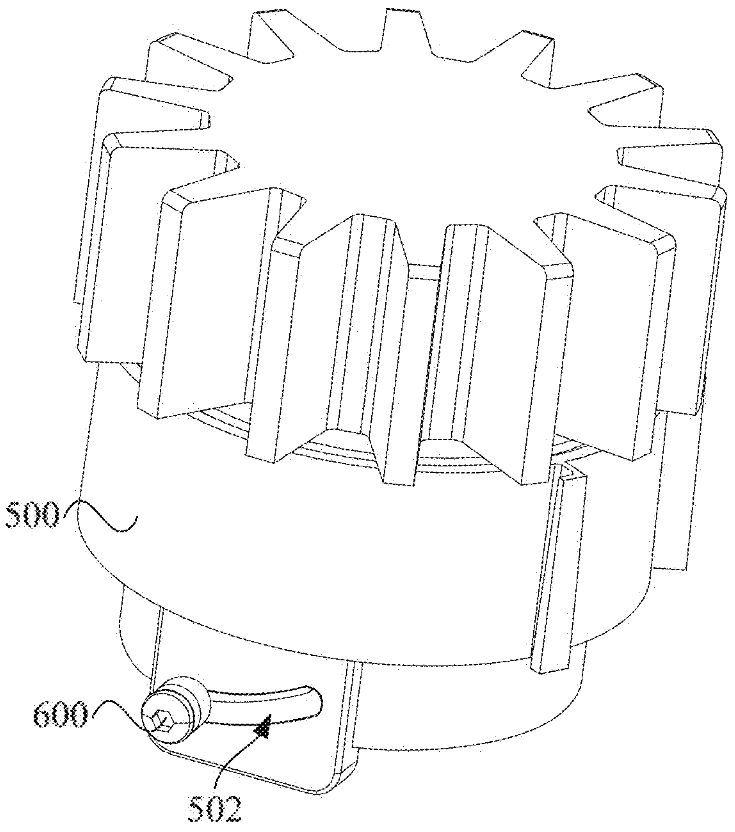
FIG. 7 is a partial view of an irradiation angle adjustment component according to the sixth embodiment of the present invention.

In the sixth embodiment, referring to FIG. 7, a second arcuate groove 502 is provided on a side wall of the connection part. The second arcuate groove 502 extends in the direction away from the optical component 300, and the second arcuate groove 502 extends along the circumferential direction of the light source 400. A portion of the adjustment part 600 is slidably connected to the second arcuate groove 502 and rotatably connected to the connection part 500. It is understood that the second arcuate groove 502 can also be defined on the adjustment part 600, and a portion of the connection part 500 is slidably connected to the second arcuate groove 502 and rotatably connected to the adjustment part 600.

Figure 8:
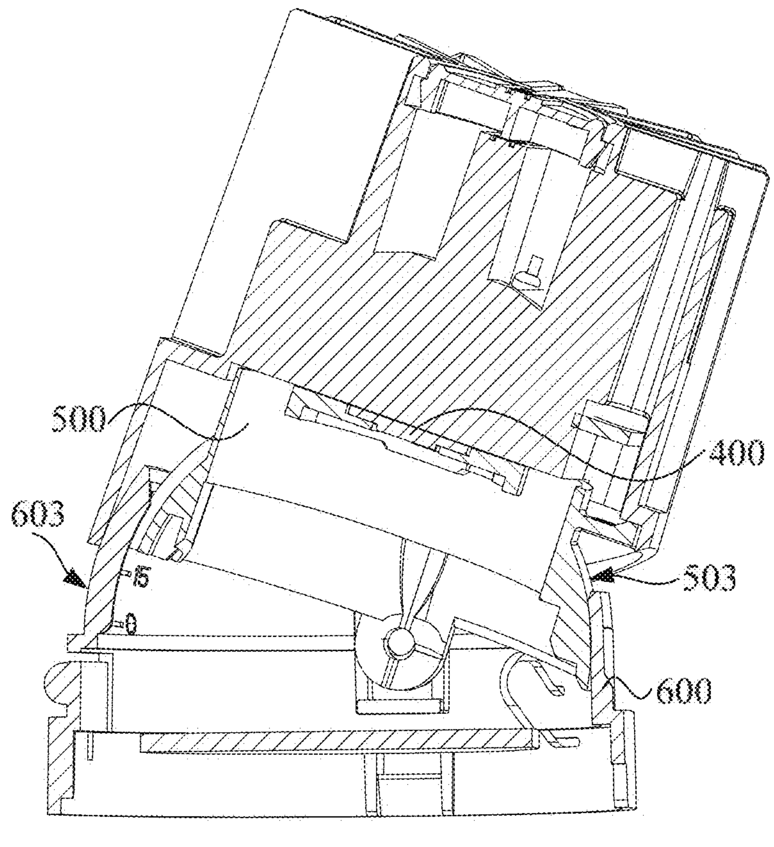
FIG. 8 is a partial view of an irradiation angle adjustment component according to the seventh embodiment of the present invention.
Figure 9:
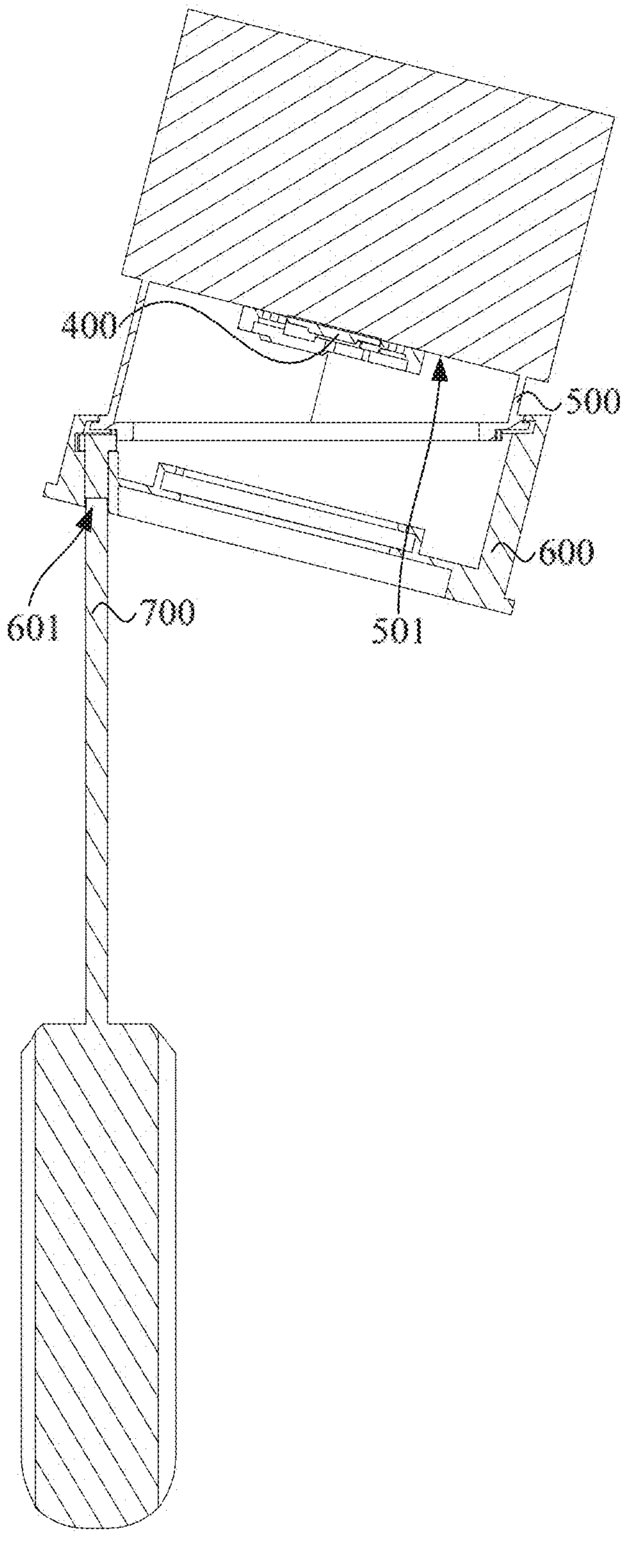
FIG. 9 is a partial view of an irradiation angle adjustment component according to the eighth embodiment of the present invention.
Figure 10:
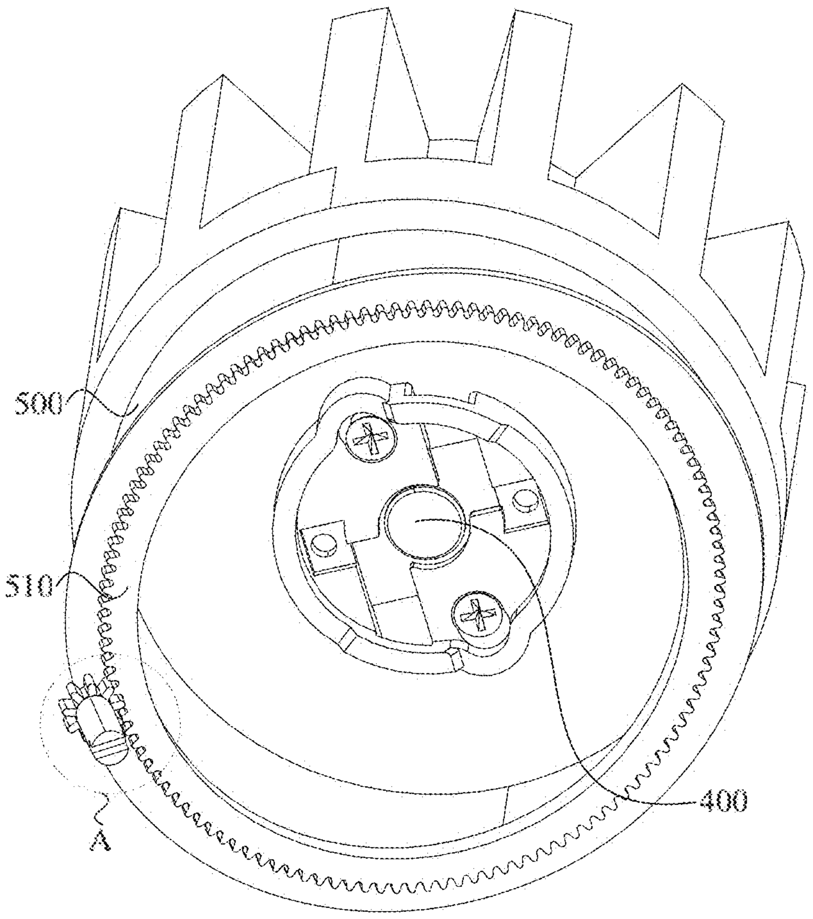
FIG. 10 is a partial view of the irradiation angle adjustment component in FIG. 9.
Figure 11:
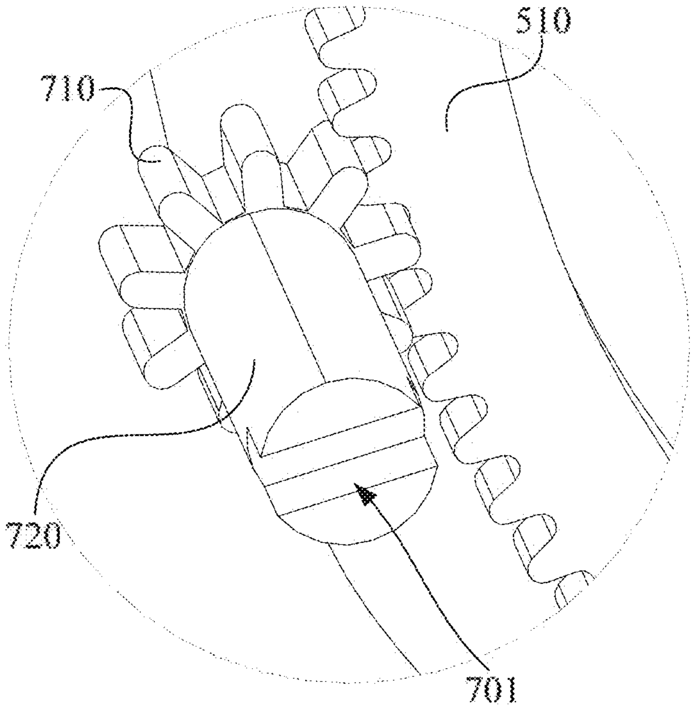
FIG. 11 is an enlarged view of the irradiation angle adjustment component in FIG. 10 at position A.
Figure 12:
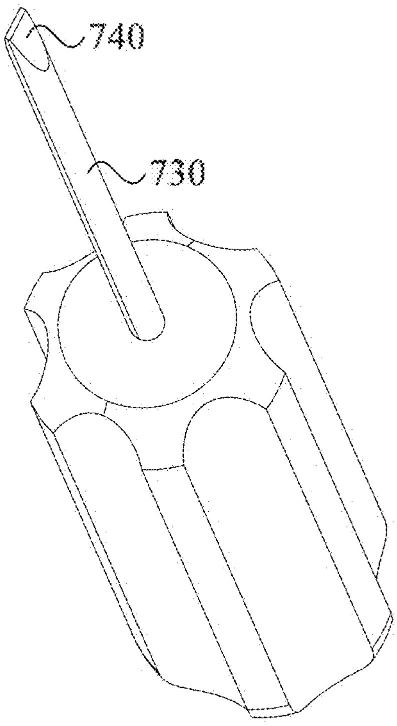
FIG. 12 is another partial view of the irradiation angle adjustment component in FIG. 9.

In the seventh embodiment, referring to FIG. 8, the connection part 500 is provided with a first spherical surface 503, and the first spherical surface 503 is offset from the light source 400. Further, the adjustment part 600 is provided with a second spherical surface 603, and the second spherical surface 603 is offset from the optical component 300. The second spherical surface 603 is attached to the first spherical surface 503, so that the adjustment part 600 is rotatable relative to the connection part 500.

Further, the first spherical surface 503 is set on an outer peripheral wall of the connection part 500; the second spherical surface 603 is set on an inner peripheral wall of the adjustment part 600; and the first spherical surface 503 is attached to the second spherical surface 603, so that the first spherical surface 503 can rotate and/or swing relative to the second spherical surface 603. Furthermore, the connection part 500 is snap-fitted to the adjustment part 600. That is, a maximum width of the cross-section at the first spherical surface 503 of the connection part 500 is greater than a minimum width of the cross-section at the second spherical surface 603 of the adjustment part 600.

Alternatively, the first spherical surface is disposed on an inner peripheral wall of the connection part, the second spherical surface is disposed on an outer peripheral wall of the adjustment part, and the first spherical surface is attached to the second spherical surface. Further, the connection part is snap-fitted to the adjustment part. That is, a maximum width of the cross-section at the second spherical surface of the adjustment part is greater than a minimum width of the cross-section at the first spherical surface of the connection part.

Further, the adjustment part and the connection part are magnetically connected. Furthermore, the first spherical surface is provided with a magnetic piece, such as a magnet, the magnetic piece is embedded in the first spherical surface; or, an exposed surface of the magnetic piece is parallel to the first spherical surface. Similarly, the second spherical surface is provided with a magnetic piece, such as a magnet, the magnetic piece is embedded in the second spherical surface; or, an exposed surface of the magnetic piece is parallel to the second spherical surface. Alternatively, both the adjustment part and the connection part are magnetic pieces, such as magnets.

It is understood that the first spherical surface and the second spherical surface can be annular, the remaining part of a ring after radial cutting, or the remaining part of a sphere after transversal cutting. In addition, the first spherical surface and the second spherical surface are continuous or discontinuous. For example, an annular spherical surface is cut at least four times to form two independent partial spherical surfaces, and the two partial spherical surfaces are as the first spherical surface, which reduces interference between the connection part, adjustment part, and support.

It is understood that for an angle-adjustable luminaire, the optical component is located at the front of the light source. That is, when the angle-adjustable luminaire is installed on the ceiling, the optical component is exposed to the ceiling, and the light source is hidden within the ceiling. As a result, when it is necessary to adjust the illumination angle of the angle-adjustable luminaire, the entire angle-adjustable luminaire needs to be removed from the ceiling, and then the light source needs to be rotated and/or swung before the angle-adjustable luminaire can be reinstalled on the ceiling. This makes the angle adjustment of the angle-adjustable luminaire less convenient and difficult to meet the user's needs. Therefore, in order to better meet the needs of users, it is necessary to improve the ease of use of angle-adjustable luminaires.

In the eighth embodiment, referring to FIGS. 9 to 12, the connection part 500 is provided with a first wedge-shaped section 501, the light source 400 is connected to the first wedge-shaped section 501, and the first wedge-shaped section 501 is set towards the optical component 300. Further, the connection part 500 is rotatably connected to the adjustment part 600, and a rotation axis of the connection part 500 is parallel to a height direction of the first wedge-shaped section 501. It can be understood that the height of the wedge-shaped section refers to the vertical distance between the top and the bottom, and the height direction is the length direction of the vertical distance between the top and the bottom.

Further, the connection part 500 is provided with a first gear 510, and the first gear 510 is arranged circumferentially around the connection part 500. Furthermore, the irradiation angle adjustment component 10 also includes an auxiliary adjusting component 700, the auxiliary adjusting component 700 is rotatably connected to the adjusting component 600, and a rotation axis of the auxiliary adjusting component 700 is parallel to the rotation axis of the connection part 500. The auxiliary adjusting component 700 is provided with a second gear 710, the second gear 710 is arranged circumferentially around the auxiliary adjusting component 700, and the first gear 510 and the second gear 710 are meshing connected. Furthermore, the auxiliary adjusting component 700 is set to protrude at least partially from the support 800. Furthermore, the auxiliary adjusting component is offset from the optical component, and the auxiliary adjusting component is offset from the structure used for setting the optical component, such as the auxiliary adjusting component is offset from the fixing component and the regulating part.

It is understood that the connection part 500 is provided with a first wedge-shaped section 501, the light source 400 is connected to the first wedge-shaped section 501, and the rotation axis of the connection part 500 is parallel to a height direction of the first wedge-shaped section 501. In this way, the light source 400 can be rotated 360 degrees with less reserved space or without reserved space, and the adjusting component 600 can drive the light source 400 to rotate the direction of emergence of the light 360 degrees, effectively realizing the 360-degree arbitrary rotation adjustment of the irradiation direction of the angle-adjustable luminaire. In addition, the angle-adjustable luminaire can also adjust the direction of emergence of the light after installation, which is more convenient to use.

Further, a clearance hole 601 is provided on the adjustment part 600. The auxiliary adjustment part 700 includes an engaging portion 720 and a handling portion 730. The engaging portion 720 is rotatably connected to the adjustment part 600, the second gear 710 is circumferentially connected to a periphery of the engaging portion 720, a rotation axis of the engaging portion 720 is parallel to the rotation axis of the connection part 500, the handling portion 730 passes through the clearance hole 601 and is connected to the end of the engaging portion 720, and the handling portion 730 is rotatably connected to the adjustment part 600. The rotation axis of the handling portion 730 is the same as the rotation axis of the engaging portion 720, and the handling portion 730 protrudes at least partially from the support 800. Further, the engaging portion 720 and the handling portion 730 are both offset from the optical component 300, and the engaging portion 720 and the handling portion 730 are also offset from the structure for setting the optical component 300, such as the engaging portion 720 and the handling portion 730 being offset form the fixing part and the regulating part, respectively. Further, a plug-in groove 701 is provided at the end of the engaging portion 720; a plug-in block 740 I provided at the end of the handling portion 730; and the plug-in block 740 is plugged into the plug-in groove 701, so that the handling portion 730 is plugged into the engaging portion 720. It better reduces the influence of the auxiliary adjustment part 700 on the light emergence effect of the angle-adjustable luminaire, and effectively improves the usability of the angle-adjustable luminaire. Furthermore, the engaging portion 720 is snap-fitted at the clearance hole 601, and the engaging portion 720 is rotatably connected to the adjustment part 600.

Figure 13:
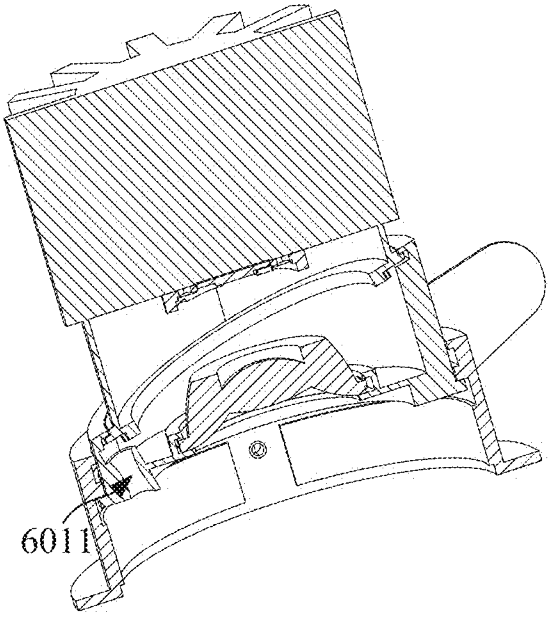
FIG. 13 is a partial view of another irradiation angle adjustment component according to the eighth embodiment of the present invention.

It can be understood that, referring to FIG. 13, the engaging portion 720 is rotatably connected to the adjustment part 600. Further, the engaging portion 720 is snap-fitted to the adjustment part 600 and can be rotatably connected to the adjustment part 600. If the engaging portion 720 is snap-fitted to the adjustment part 600 too tightly, it will result in poor rotational smoothness of the engaging portion 720. However, if the engaging portion 720 is snap-fitted to the adjustment part 600 too loosely, it will result in poor meshing stability of the first gear 510 and the second gear 710, which will significantly affect the rotational stability of the adjustment part 600. Therefore, in order to better ensure the rotational smoothness of the engaging portion 720, thereby ensuring the user experience, and to ensure the rotational stability of the adjustment part 600, in one embodiment, an inner wall of the clearance hole 601 is a convex arc surface 6011, and the engaging portion 720 abuts against the convex arc surface 6011. It can be understood that when the inner wall of the clearance hole 601 is the convex arc surface 6011, the wall of the clearance hole 601 only linearly abuts against the engaging portion 720, effectively ensuring that the engaging portion 720 is stably snap-fitted at the clearance hole 601, and causing the clearance hole 601 to allow the engaging portion 720 to be swingably disposed therein. This allows the engaging portion 720 to swing towards the first gear 510 after the handling portion 730 is inserted into the plug-in groove 701 of the engaging portion 720, thereby achieving stable meshing of the first gear 510 and the second gear 710 to adjust the rotational stability of the adjustment part 600.

Figure 14:
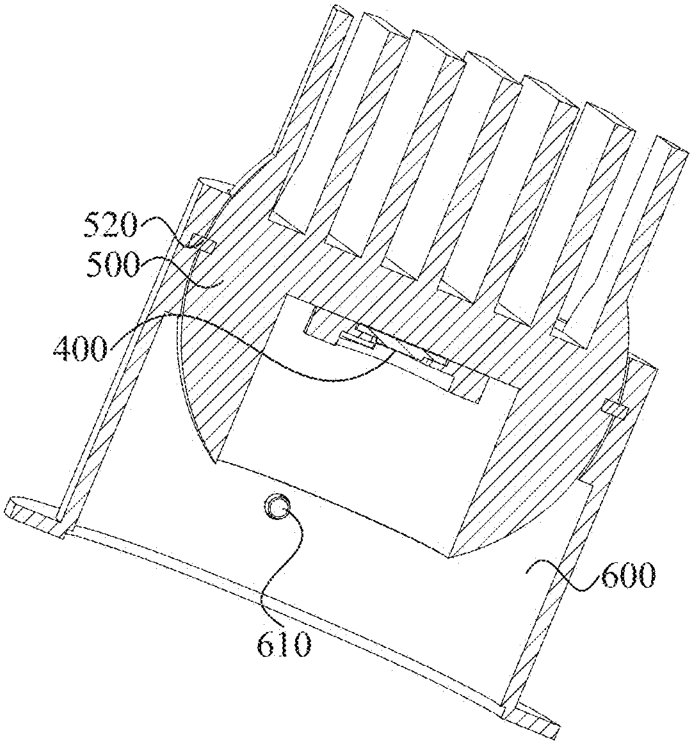
FIG. 14 is a partial view of an irradiation angle adjustment component according to the ninth embodiment of the present invention.

Referring to FIG. 14, in some embodiments, the adjustment part 600 is rotatably and/or swingably connected to the connection part 500, and the adjustment part 600 is rotatably and/or swingably connected to the support 800. A rotation axis of the adjustment part 600 intersects the rotation axis of the connection part 500. Preferably, the rotation axis of the adjustment part 600 is perpendicular to the rotation of the connection part 500. Furthermore, the plane containing the rotation axis of the adjustment part 600 and the rotation axis of the connection part 500 intersects the propagation direction of the light emitted from the light source 400.

In the nineth embodiment, referring to FIG. 14, a side wall of the adjustment part 600 protrudes with a first rotating rod 610, the first rotating rod 610 is rotatably connected to the support 800, the first rotating rod 610 is offset from the optical component 300, and the first rotating rod 610 is located on the periphery of the light source 400. Furthermore, an outer wall of the connection part 500 protrudes with a second rotating rod 520, the light source 400 is exposed to at least one end wall of the connection part 500, and the second rotating rod 520 is rotatably connected to the adjustment part 600.

Below describes the scheme wherein the aforementioned optical component is rotated and/or pivoted relative to the support.

It should be noted that by rotating or swinging the optical component relative to the support, the optical component ultimately swings relative to the support to change the angle of emergence of the light emitted from the optical component. Further, the optical component ultimately swings 360° relative to the support.

Referring to FIGS. 15 to 26, in some embodiments, the irradiation angle adjustment component 10 further includes a fixing part 100 and an regulating part 200, the optical component 300 penetrates through the fixing part 100 and is connected to the fixing part 100, the regulating part 200 is disposed on the fixing part 100 and the support 800, and at least one of the fixing part 100 and the support 800 is rotatably and/or swingably connected to the regulating part 200 to change the angle of emergence of the light emitted from the optical component 300.

In some embodiments, the fixing part is a plastic fixing part. Furthermore, the regulating part is a plastic regulating part.

Referring to FIGS. 15 to 18, in some embodiments, the regulating part 200 is mounted on the fixing part 100, and the regulating part 200 is rotatably and/or swingably connected to the support 800.

Figure 15:
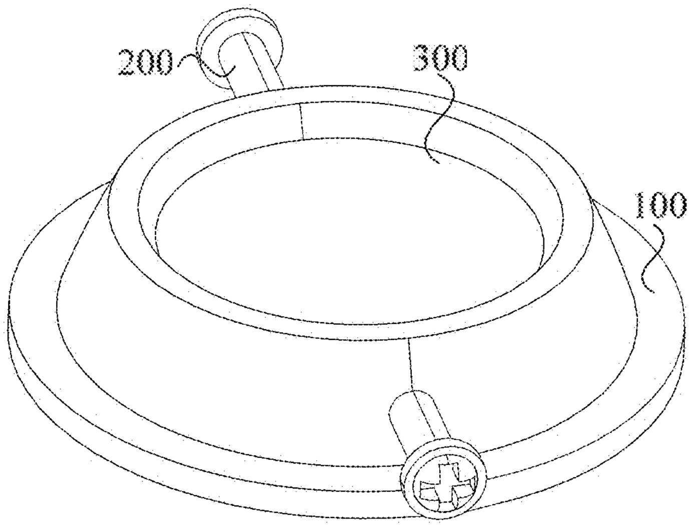
FIG. 15 is a partial view of an irradiation angle adjustment component according to the tenth embodiment of the present invention.

In the tenth embodiment, referring to FIG. 15, the regulating part 200 is a bolt. One end of the regulating part 200 is connected to the fixing part 100, and the other end of the regulating part 200 is rotatably connected to the support 800. The regulating part 200 is located on a periphery of the optical component 300.

Figure 16:
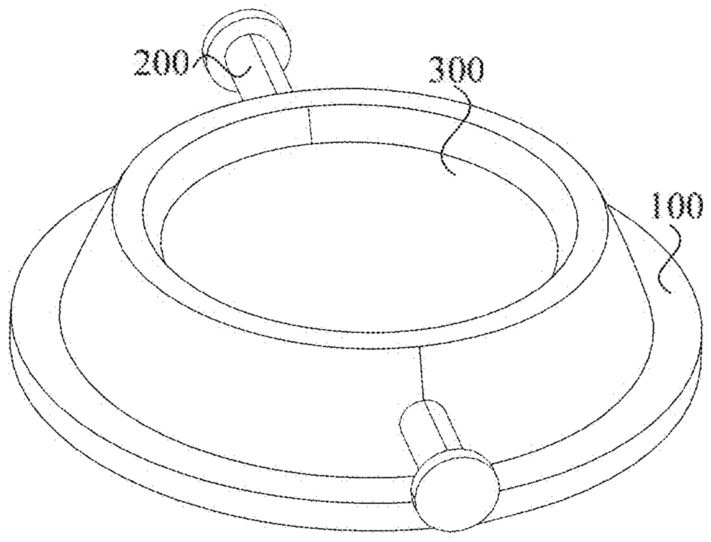
FIG. 16 is a partial view of the irradiation angle adjustment component of the tenth embodiment of the present invention.

In the eleventh embodiment, referring to FIG. 16, the regulating part 200 is a shaft. One end of the regulating part 200 is connected to the fixed piece 100, and the other end of the regulating part 200 is rotatably connected to the support 800. The regulating part 200 is located on the periphery of the optical component 300.

Figure 17:
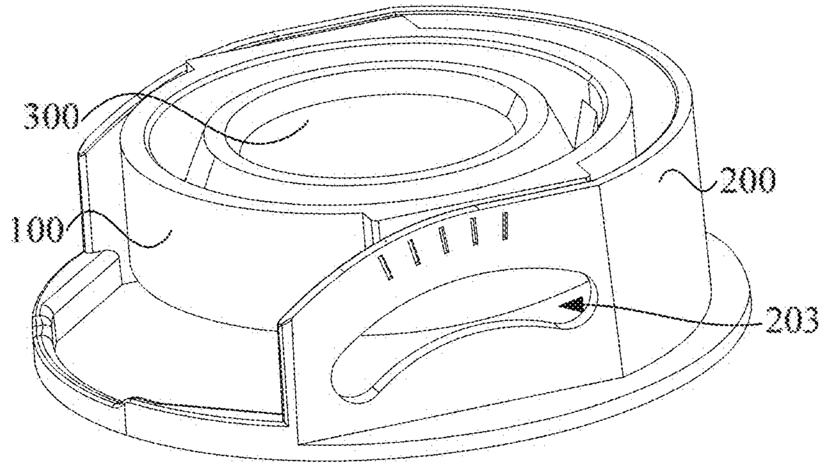
FIG. 17 is a partial view of an irradiation angle adjustment component according to the eleventh embodiment of the present invention.
Figure 18:
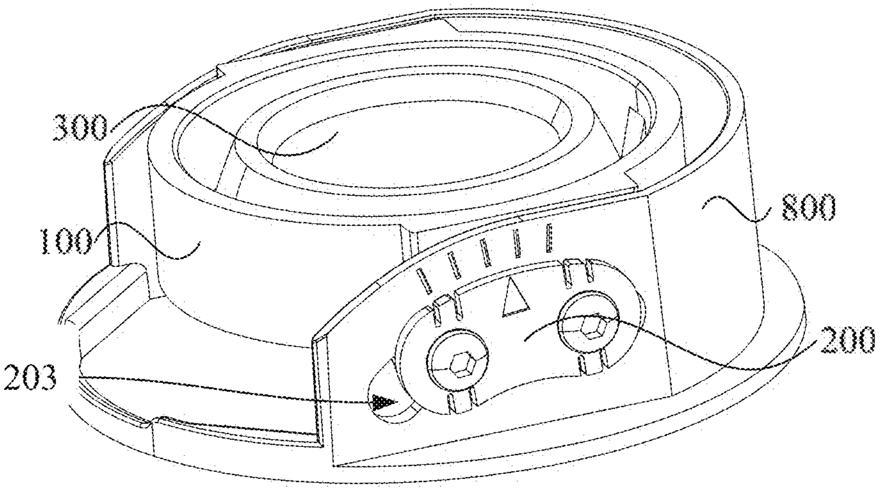
FIG. 18 is a partial view of another irradiation angle adjustment component according to the eleventh embodiment of the present invention.

In the twelfth embodiment, referring to FIG. 17, a third arcuate groove 203 is provided on a side wall of the regulating part 200. The third arcuate groove 203 extends in the direction away from the light source 400, and the third arcuate groove 203 extends along the circumferential direction of the optical component 300. A portion of the support 800 is slidably connected to the third arcuate groove 203 and is rotatably connected to the regulating part 200. It is understood that, referring to FIG. 18, the third arcuate groove 203 can also be defined on the support 800, and a portion of the regulating part 200 is slidably connected to the third arcuate groove 203 and is rotatably connected to the support 800.

Referring to FIGS. 19 to 25, in some embodiments, the regulating part 200 is rotatably and/or swingably connected to the fixing part 100, and the regulating part 200 is mounted on the support 800.

Figure 19:
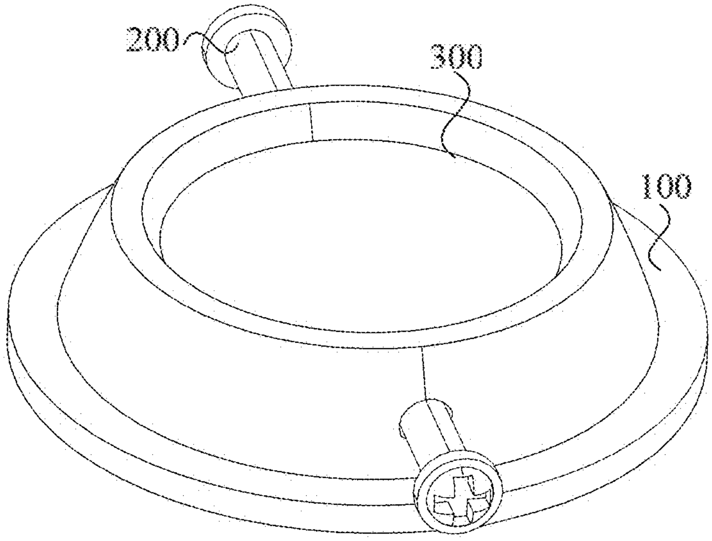
FIG. 19 is a partial view of an irradiation angle adjustment component according to the thirteenth embodiment of the present invention.

In the thirteenth embodiment, referring to FIG. 19, the regulating part 200 is a bolt. One end of the regulating part 200 is connected to the support 800, and the other end of the regulating part 200 is rotatably connected to the fixing part 100. The regulating part 200 is located on the periphery of the optical component 300.

Figure 20:
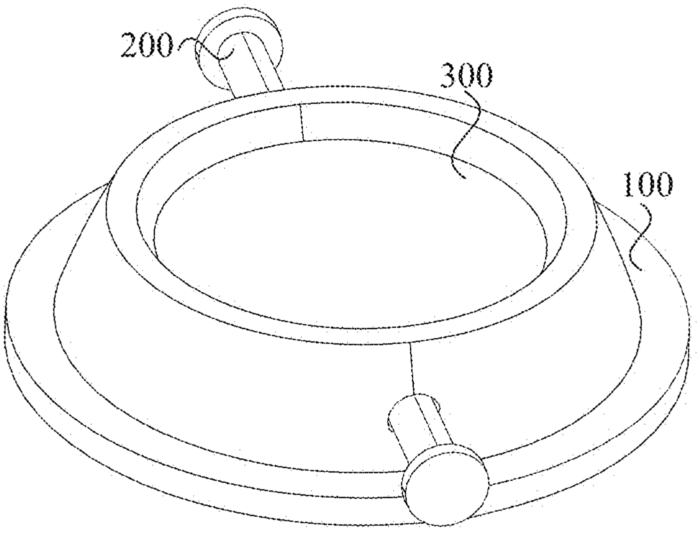
FIG. 20 is a partial view of an irradiation angle adjustment component according to the fourteenth embodiment of the present invention.

In the fourteenth embodiment, referring to FIG. 20, the regulating part 200 is a rotating shaft. One end of the regulating part 200 is connected to the support 800, and the other end of the regulating part 200 is rotatably connected to the fixing part 100. The regulating part 200 is located on the periphery of the optical component 300.

Figure 21:
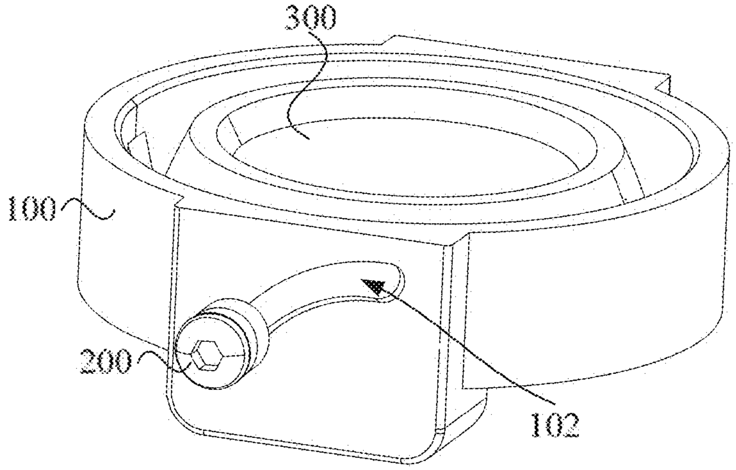
FIG. 21 is a partial view of an irradiation angle adjustment component according to the fifteenth embodiment of the present invention.

In the fifteenth embodiment, referring to FIG. 21, an arcuate groove 102 is provided on a side wall of the fixing part 100. The arcuate groove 102 extends in a direction away from the light source 400, and the arcuate groove 102 extends along the circumferential direction of the optical component 300. The regulating part 200 is slidably connected to the arcuate groove 102 and is rotatably connected to the fixing part 100.

Figure 22:
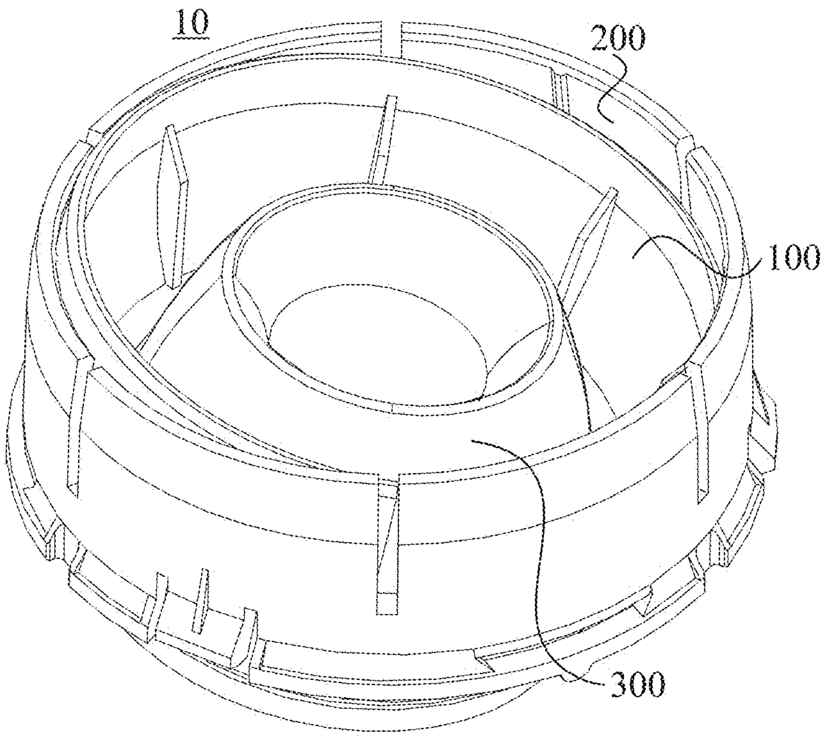
FIG. 22 is a partial view of an irradiation angle adjustment component according to the sixteenth embodiment of the present invention.
Figure 23:
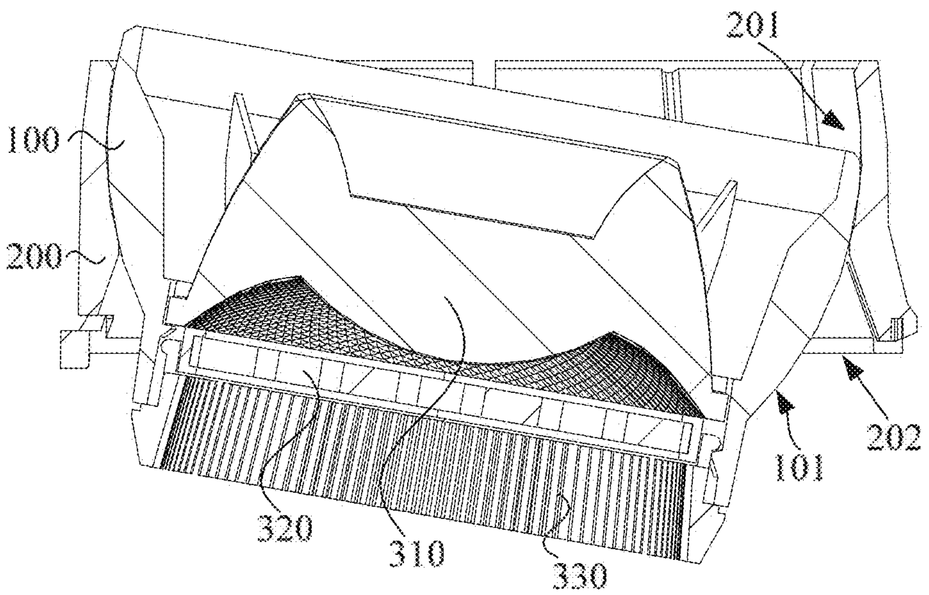
FIG. 23 is a sectional view of the irradiation angle adjustment component in FIG. 22.
Figure 24:
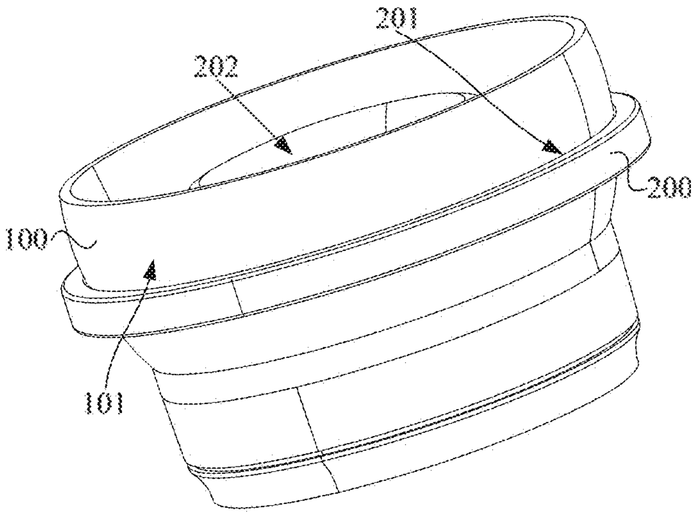
FIG. 24 is a partial view of another irradiation angle adjustment component according to the sixteenth embodiment of the present invention.

In the sixteenth embodiment, referring to FIGS. 22 to 24, the fixing part 100 is provided with a third spherical surface 101, and the third spherical surface 101 is offset from the optical component 300. Further, the regulating part 200 is provided with a fourth spherical surface 201, the fourth spherical surface 201 is offset from the light source 400, and the fourth spherical surface 201 is attached to the third spherical surface 101, so that the regulating part 200 can rotate relative to the fixing part 100.

Referring to FIGS. 22 to 23, the third spherical surface 101 is set on an outer peripheral wall of the fixing part 100; the fourth spherical surface 201 is set on an inner peripheral wall of the regulating part 200, and the third spherical surface 101 is attached to the fourth spherical surface 201, so that the third spherical surface 101 is rotatable and/or swingable relative to the fourth spherical surface 201. Further, the fixing part 100 is snap-fitted to the regulating part 200. That is, a maximum width of the cross-section at the third spherical surface 101 of the fixing part 100 is greater than a minimum width of the cross-section at the fourth spherical surface 201 of the regulating part 200.

Alternatively, the third spherical surface is set on an inner peripheral wall of the fixing part, the fourth spherical surface is set on an outer peripheral wall of the regulating part, and the third spherical surface is attached to the fourth spherical surface. Furthermore, the fixing part is snap-fitted to the regulating part. That is, a maximum width of the cross-section at the fourth spherical surface of the regulating part is greater than a minimum width of the cross-section at the third spherical surface of the fixing part.

Referring to FIG. 24, the regulating part 200 and the fixing part 100 are magnetically connected. Furthermore, the third spherical surface 101 is provided with a magnetic piece, such as a magnet, the magnetic piece is embedded in the third spherical surface 101, or, the exposed surface of the magnetic piece is parallel to the third spherical surface 101. Similarly, the fourth spherical surface 201 is provided with a magnetic piece, such as a magnet, the magnetic piece is embedded in the fourth spherical surface 201, or, the exposed surface of the magnetic piece is parallel to the fourth spherical surface 201.

Alternatively, both the regulating part 200 and the fixing part 100 are magnetic pieces, such as magnets.

Furthermore, the third spherical surface and fourth spherical surface can be annular, the remaining part of a ring after radial cutting, or the remaining part of a sphere after transversal cutting. Moreover, the third spherical surface and fourth spherical surface are continuous or discontinuous. For example, an annular spherical surface is cut at least four times to form two independent partial spherical surfaces, and the two partial spherical surfaces are as the third spherical surface, which reduces interference between the fixing part, the regulating part and the support.

Referring to FIGS. 22 to 24, the regulating part 200 is provided with a beam channel 202, through which light passes. The fourth spherical surface 201 is an annular concave spherical surface, which is located on the inner wall of the regulating part 200 and communicates with the beam channel 202. Furthermore, the fixing component 100 is an annular fixing component 100, and the third spherical surface 101 is an annular convex spherical surface, which is located on the outer wall of the annular fixing component 100 and is in close contact with the annular concave spherical surface. The annular fixing component 100 is rotatably connected to the fixing component 100 at the center of the annular convex spherical surface, and the optical component 300 is connected to the inner wall of the annul ar fixing component 100, with the optical component 300 blocking the beam channel 202.

It is understood that the optical component 300 is connected to the inner wall of the regulating part 200, and the optical component 300 is sealed in the beam channel 202. The light emitted from the light source 400 passes through the beam channel 202. Thus, the adjustment of the angle of emergence of the emitted light can be achieved by adjusting the rotation and/or swing angle of the optical component 300 on the adjusting component 200. Further, the regulating part 200 is connected to the fixing component 100 with a center of the sphere of the annular convex spherical surface as a rotation point, so that 360-degree rotation of the regulating part 200 can be achieved. This enables the regulating part 200 to drive the optical component 300 to achieve 360-degree rotation of the direction of emergence of the emitted light. The light source 400 does not actually rotate, which effectively avoids the drive power supply wires from being knotted and effectively realizes the 360-degree arbitrary rotation adjustment of the irradiation direction of the angle-adjustable luminaire. In addition, the angle-adjustable luminaire can adjust the projection direction of the light after installation, which is more convenient to use.

Figure 25:
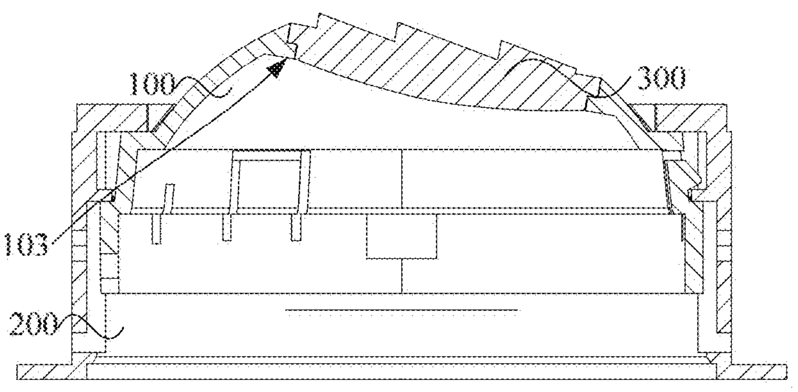
FIG. 25 is a partial view of an irradiation angle adjustment component according to the seventeenth embodiment of the present invention.

In the seventeenth embodiment, referring to FIG. 25, the fixing part 100 is provided with a second wedge-shaped section 103, the optical component 300 is exposed on the second wedge-shaped section 103, and the second wedge-shaped section 103 is set away from the light source 400. Further, the fixing part 100 is rotatably connected to the regulating part 200, and a rotation axis of the fixing part 100 is parallel to a height direction of the second wedge-shaped section 103. It can be understood that the height of the wedge-shaped section refers to a vertical distance between the top and the bottom, and the height direction is a length direction of the vertical distance between the top and the bottom. In this way, the regulating part 200 can be rotated 360 degrees, thereby realizing that the regulating part 200 can drive the angle of emergence of the light emitted from the optical component 300 to rotate 360 degrees, while the light source 400 does not actually rotate, which better avoids the drive power supply wires from being knotted, and effectively realizes the 360-degree arbitrary rotation adjustment of the irradiation direction of the angle-adjustable luminaire. In addition, the angle-adjustable luminaire can adjust the projection direction of the light after installation, which is more convenient to use.

Figure 26:
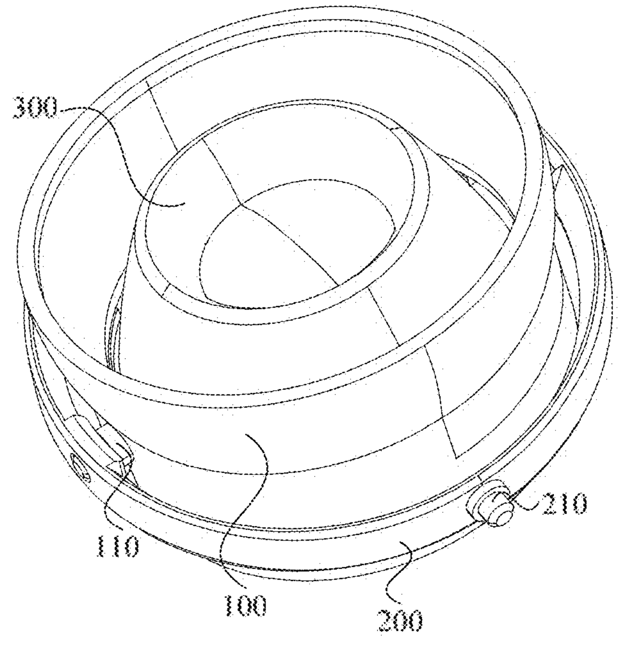
FIG. 26 is a partial view of an irradiation angle adjustment component according to the eighteenth embodiment of the present invention.
Figure 27:
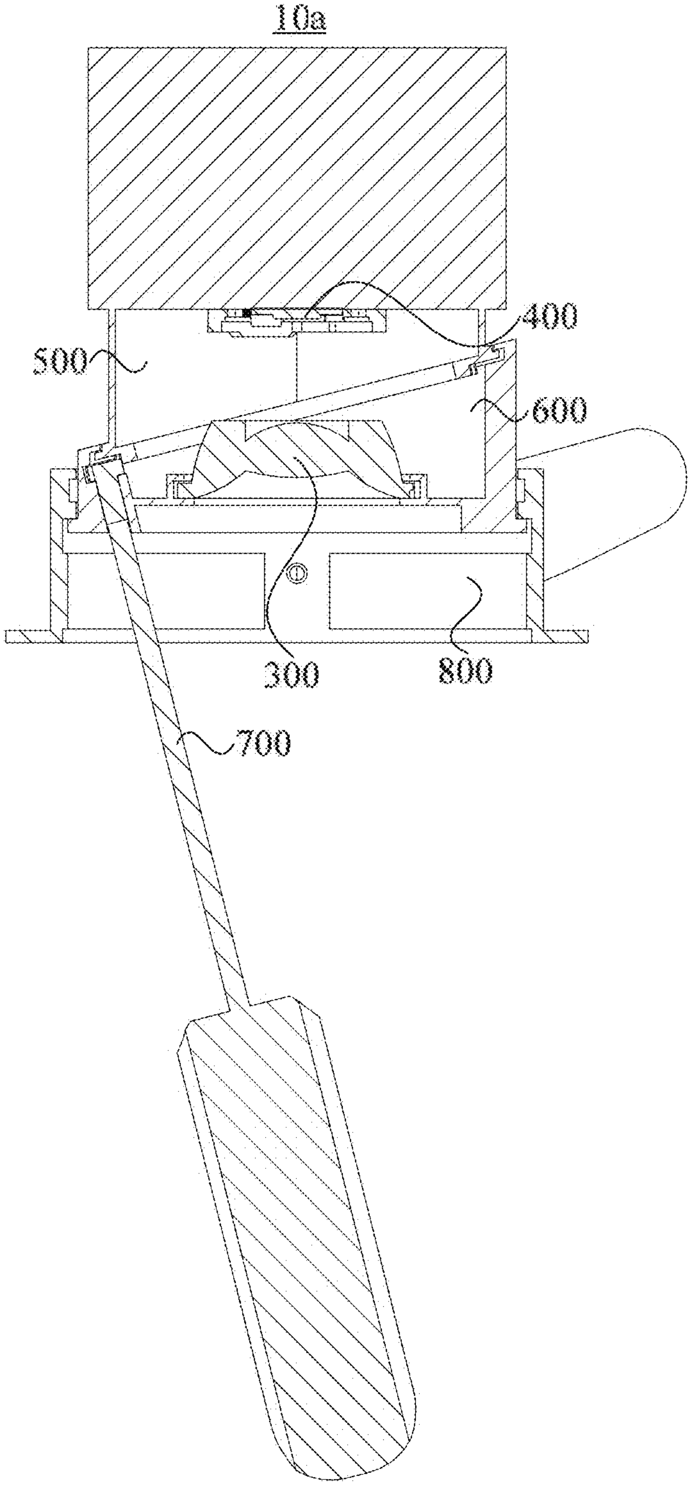
FIG. 27 is a sectional view of the irradiation angle adjustment component according to one embodiment of the present invention.
Figure 28:
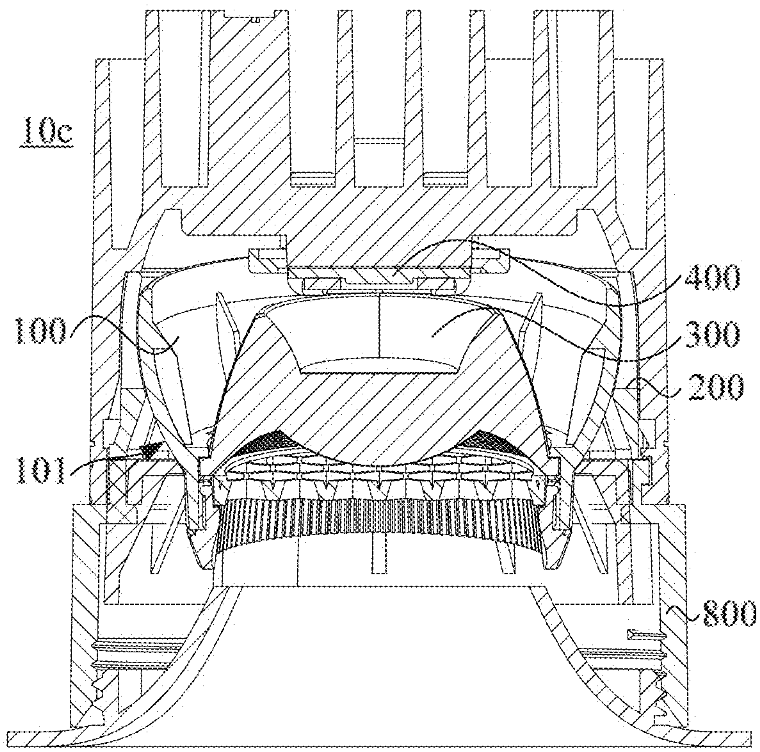
FIG. 28 is a sectional view of the irradiation angle adjustment component according to another embodiment of the present invention.
Figure 29:
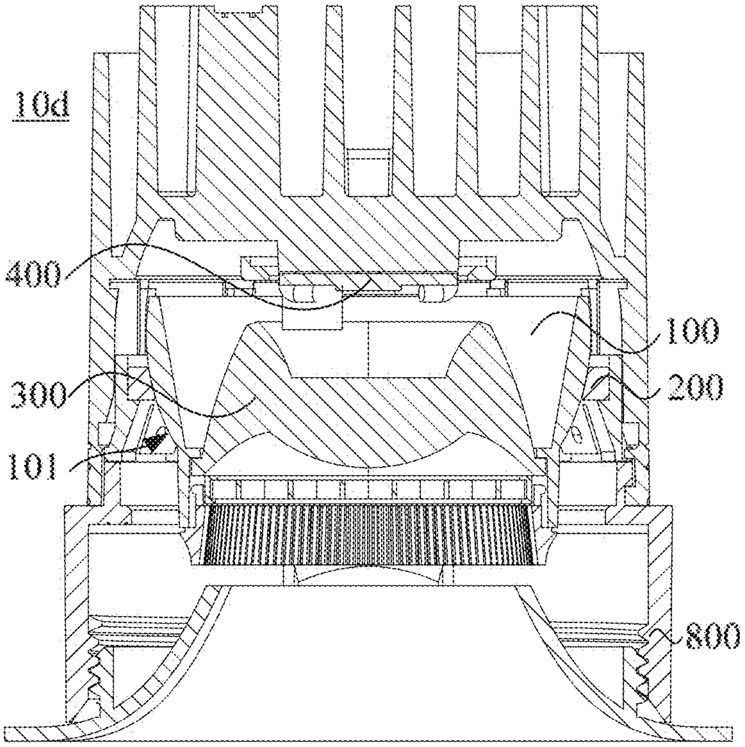
FIG. 29 is a sectional view of the irradiation angle adjustment component according to another embodiment of the present invention.
Figure 30:
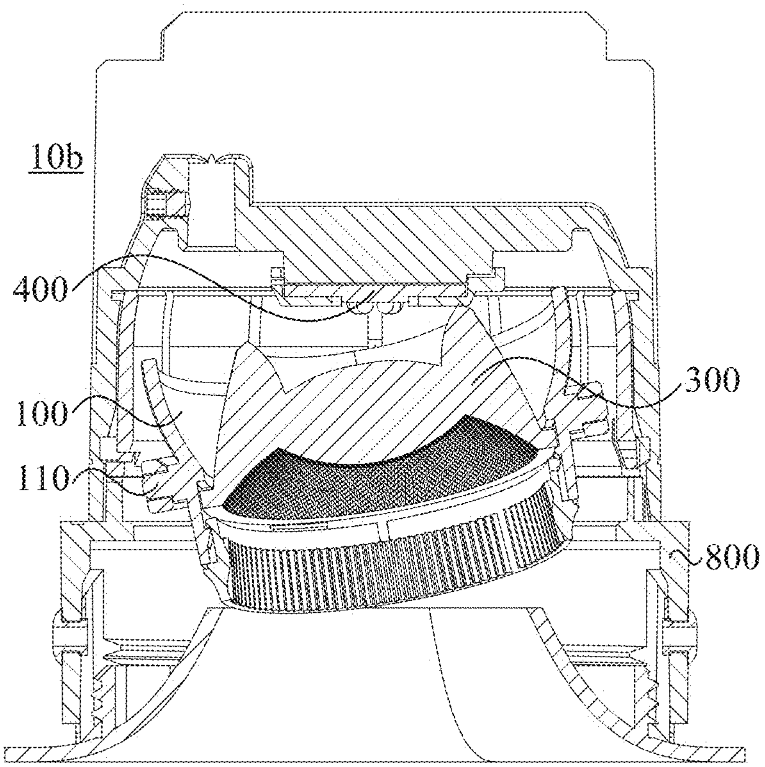
FIG. 30 is a sectional view of the irradiation angle adjustment component according to another embodiment of the present invention.
Figure 31:
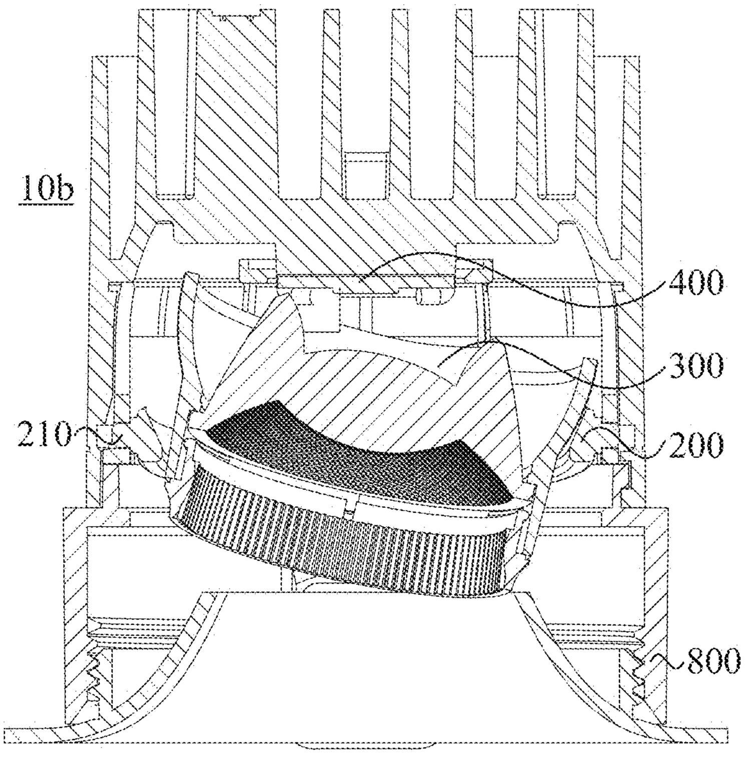
FIG. 31 is another sectional view of the irradiation angle adjustment component in FIG. 30.
Figure 32:
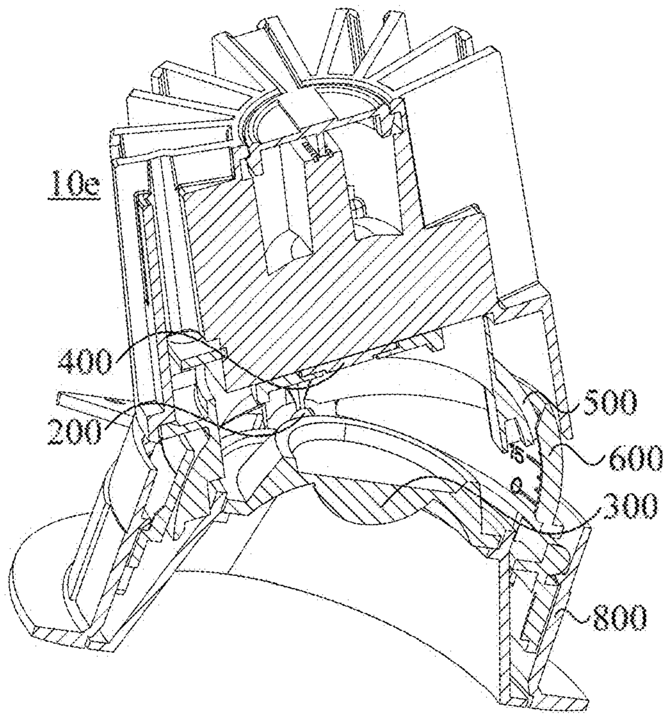
FIG. 32 is a sectional view of the irradiation angle adjustment component according to another embodiment of the present invention.
Figure 33:
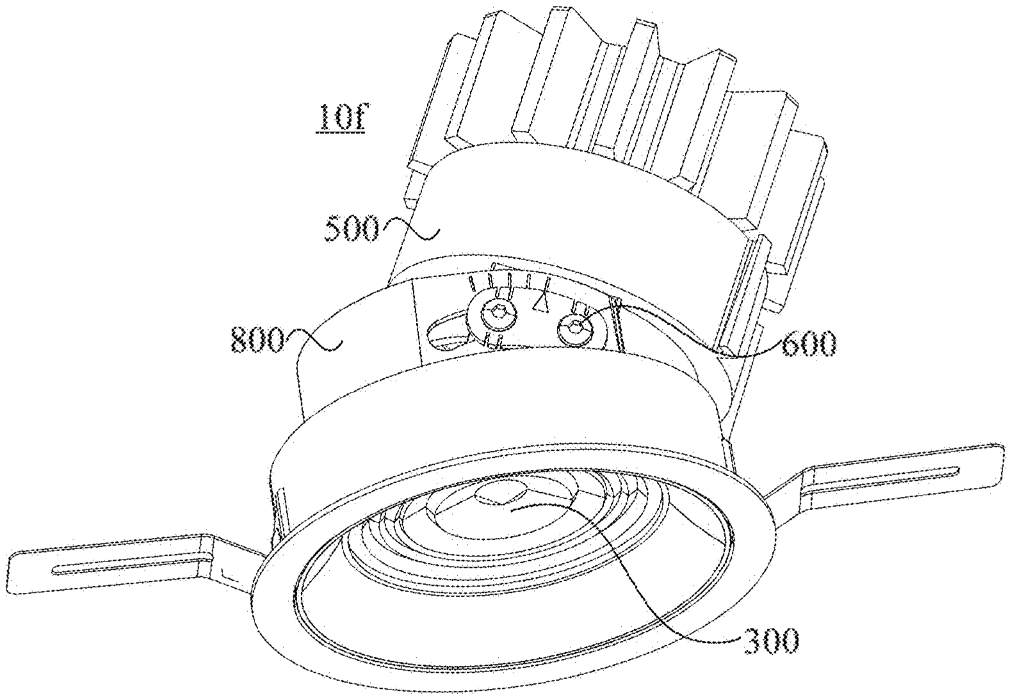
FIG. 33 is a sectional view of the irradiation angle adjustment component according to another embodiment of the present invention.

Referring to FIG. 26, in some embodiments, the regulating part 200 is rotatably and/or swingably connected to the fixing part 100, and the regulating part 200 is rotatably and/or swingably connected to the support 800, a rotation axis of the regulating part 200 intersects the axis of rotation of the fixing part 100. Preferably, the rotation axis of the regulating part 200 is perpendicular to the rotation axis of the fixing part 100. Further, the plane containing the rotation axis of the regulating part 200 and the rotation axis of the fixing part 100 intersects the direction of emergence of the light emitted from the light source 400.

In the eighteenth embodiment, referring to FIG. 26, an outer wall of the regulating part 200 is provided with a third rotating rod 210. The third rotating rod 210 is rotatably connected to the support 800. The third rotating rod 210 is offset from the light source 400, and the third rotating rod 210 is located on the periphery of the optical component 300. Further, an outer wall of the fixing part 100 is provided with a fourth rotating rod 110. The optical component 300 is exposed at both ends of the fixing part 100. The fourth rotating rod 110 is rotatably connected to the regulating part 200. In this way, the combination of the regulating part 200 and the fixing part 100 allows for 360-degree rotation, thereby realizing that the regulating part 200 can drive the angle of emergence of the light emitted from the optical component 300 to rotate 360 degrees, while the light source 400 does not actually rotate, which effectively avoids the drive power supply wires from being knotted, and effectively realizes the 360-degree arbitrary rotation adjustment of the irradiation direction of the angle-adjustable luminaire. In addition, the angle-adjustable luminaire can be adjusted to the projection direction of the light after installation, which is more convenient to use.

Referring to FIGS. 22 to 23, in some embodiments, the optical component 300 includes a lens 310. Further, a peripheral wall of the lens 310 is connected to the fixing part 100. Further, the lens 310 is a TIR lens 310. Further, there can be multiple quantities or types of lenses 310. According to conventional methods or required effects, several lenses 310 are stacked in order, and several lens 310 are installed by conventional methods used to realize the connection of the lens 310 to the rotating regulating part 200.

In some embodiments, the optical component 300 also includes a honeycomb grid 320 and/or an accessory ring 330. The lens 310, the honeycomb grid 320, and the accessory ring 330 are stacked in sequence, and the honeycomb grid 320 and the accessory ring 330 are both located on a side of the lens 310 away from the light source 400. Further, the lens 310, the honeycomb grid 320, and the accessory ring 330 are connected to the fixing part 100 together.

It is understood that the support is a structure installed on the ceiling, such as a face ring, and can also include a structure installed on the ceiling but not moving relative to the ceiling, such as a lampshade.

The present invention also provides an angle-adjustable luminaire. The angle-adjustable luminaire in one embodiment includes a drive power supply and the irradiation angle adjustment component described in any of the above embodiments, the drive power supply being electrically connected to the light source. Further, referring to FIG. 27, FIG. 28, FIG. 29, FIG. 30, FIG. 31, FIG. 32, and FIG. 33, in this embodiment, the irradiation angle adjustment component 10 includes a support 800, a light source 400 and an optical component 300, wherein the light source 400 emits light, the light at least partially enters the optical component 300, and is re-directed and emitted through the optical component 300. The light source 400 and the optical component 300 are both mounted on the support 800, and at least one of the light source 400 and the optical component 300 is rotatable and/or swingable relative to the support 800 to change the angle of emergence of the light emitted from the optical component 300.

Compared to the prior art, the present invention has at least the following advantages:

The irradiation angle adjustment component 10 of the present invention allows the light source 400 to emit light, at least part of which is incident on the optical component 300, so that the light is re-directed and emitted through the optical component 300. At least one of the light source 400 and the optical component 300 is rotatable and/or swingable relative to the support 800, thereby changing the angle of emergence of the light emitted from the optical component 300, so that the adjustment of the irradiation angle is achieved by rotating and/or swinging the optical component 300 and the light source 400 relative to the support 800. Without adjusting the volume of the heat sink, that is, ensuring the heat dissipation effect, the space required for rotation and/or swing to realize the irradiation angle adjustment is effectively reduced, the space required for rotation and/or swing when realizing the adjustment of the irradiation angle is effectively reduced, making it applicable to angle-adjustable luminaires, and better improving the universality of angle-adjustable luminaires.

It is to be noted that, in this disclosure, the terms "comprise", "include" or any other variations thereof are intended to cover non-exclusive inclusion, such that a process, method, article or apparatus comprising a set of elements includes not only those elements but also other elements that are not expressly listed or that are inherent to such process, method, article or apparatus. Without further limitation, the fact that an element is defined by the phrase "include a . . . " does not exclude the existence of another identical element in the process, method, article, or device including that element.

The above embodiments only express several implementations of the present invention, which are described in a more specific and detailed manner, but should not be understood as a limitation on the scope of the invention patent. It should be pointed out that, for ordinary technicians in the field, several modifications and improvements can be made without departing from the concept of the present invention, all of which fall within the protection scope of the present invention. Therefore, the scope of the present invention shall be subject to the appended claims.

What is claimed is:

1. An illumination angle adjustment component, comprising a support, a light source and an optical component, wherein the light source emits light that is at least partially incident on the optical component, and the light is redirected and emitted through the optical component;

the light source and the optical component are both mounted on the support, and at least one of the light source and the optical component is rotatable and/or swingable relative to the support to change an angle of emergence of the light emitted from the optical component;

wherein the light source is mounted on the support, and the optical component is rotatably and/or swingingly connected to the support;

the irradiation angle adjustment component further comprises a fixing part and a regulating part, the optical component penetrates through the fixing part and is fixed to the fixing part, the regulating part is disposed on the fixing part and the support, and at least one of the fixing part and the support is rotationally and/or swingably connected to the regulating part, so as to change the angle of emergence of the light emitted from the optical component.

2. The irradiation angle adjustment component according to claim 1, wherein the light source is rotatably and/or swingably connected to the support, and the optical component is mounted on the support;

or, the light source is mounted on the support, and the optical component is rotatably and/or pivotally connected to the support;

or, the light source and the optical component are independently rotatably and/or swingably connected to the support.

3. The irradiation angle adjustment component according to claim 1, wherein the light source is rotatably and/or swingingly connected to the support, and the optical component is mounted on the support.

4. The irradiation angle adjustment component according to claim 1, wherein the light source and the optical component are independently rotatably and/or swingably connected to the support.

5. The irradiation angle adjustment component according to claim 3, wherein the irradiation angle adjustment component further comprises a connection part and an adjustment part, the light source is connected to the connection part on a side closer to the optical component, the adjustment part is disposed on the connection part and the support, and at least one of the connection part and the support is rotatably and/or swingably connected to the adjustment part to change an angle of incidence of the light entering the optical component.

6. The irradiation angle adjustment component according to claim 5, wherein the connection part is a plastic connection part; and/or, the adjustment part is a plastic adjustment part.

7. The irradiation angle adjustment component according to claim 5, wherein the adjustment part is a bolt or a shaft, one end of the adjustment part is connected to the support, the other end of the adjustment part is rotatably connected to the connecting member, and the adjustment part is located on a periphery of the light source;

or, an arcuate groove is provided on a side wall of the connection part, the arcuate groove extends away from the optical component and extends along the circumferential direction of the light source, and a portion of the adjustment part is slidably connected to the arcuate groove and rotatably connected to the connection part;

or, a side wall of the adjustment part protrudes with a first rotating rod, the first rotating rod is rotatably connected to the support, the first rotating rod is offset from the optical component, and the first rotating rod is located on a periphery of the light source; an outer wall of the connection part protrudes with a second rotating rod, the light source is exposed to at least one end wall of the connection part, the second rotating rod is rotatably connected to the adjustment part, and a rotation axis of the adjustment part intersects a rotation axis of the connection part.

8. The irradiation angle adjustment component according to claim 5, wherein the connection part is provided with a first spherical surface, the first spherical surface is offset from the light source;

the adjustment part is provided with a second spherical surface, the second spherical surface is offset from the optical component, and the second spherical surface is attached to the first spherical surface, so that the adjustment part is rotatable relative to the connection part.

9. The irradiation angle adjustment component according to claim 8, wherein the adjustment part and the connection part are magnetically connected;

or, the connection part is snap-fitted to the adjustment part.

10. The irradiation angle adjustment component according to claim 5, wherein the connection part is provided with a first wedge-shaped section, the light source is connected to the first wedge-shaped section, the first wedge-shaped section is set towards the optical component;

the connection part is rotatably connected to the adjustment part, and a rotation axis of the connection part is parallel to a height direction of the first wedge-shaped section.

11. The irradiation angle adjustment component according to claim 10, wherein the connection part is provided with a first gear, the first gear is arranged circumferentially around the connection part;

the irradiation angle adjustment component comprises an auxiliary adjustment part, the auxiliary adjustment part is rotatably connected to the adjustment component, a rotation axis of the auxiliary adjustment part is parallel to a rotation axis of the connection part; the auxiliary adjustment part is provided with a second gear, the second gear is arranged circumferentially around the auxiliary adjustment part; the first gear and the second gear are meshed; and the auxiliary adjustment part projects at least partially from the support.

12. The irradiation angle adjustment component according to claim 1, wherein the fixing part is a plastic fixing part; and/or, the regulating part is a plastic regulating part.

13. The irradiation angle adjustment component according to claim 1, wherein the regulating part is a bolt or a rotating shaft; one end of the regulating part is connected to the fixing part, and the other end of the regulating part is rotatably connected to the support; and the regulating part is located on a periphery of the optical component;

or, a third arcuate groove is provided on a side wall of the regulating part; the third arcuate groove extends away from the light source and extends along the circumferential direction of the optical component; and the support is partially slidably connected to the third arcuate groove and is rotatably connected to the regulating part;

or, the regulating part is a bolt or a rotating shaft; one end of the regulating part is connected to the support, and the other end of the regulating part is rotatably connected to the fixing part; and the regulating part is located on the periphery of the optical component;

or, an arcuate groove is provided on a side wall of the fixing part; the arcuate groove extends away from the light source and extends along the circumferential direction of the optical component; and the regulating part is slidably connected to the arcuate groove and rotatably connected to the fixing part;

or, an outer wall of the regulating part protrudes with a third rotating rod, which is rotatably connected to the support, offset from the light source, and located on the periphery of the optical component; an outer wall of the fixing part protrudes with a fourth rotating rod; the optical component is exposed at two end walls of the fixing part; the fourth rotating rod is rotatably connected to the regulating part; and a rotation axis of the regulating part intersects with a rotation axis of the fixing part;

or, the connection part is provided with a second wedge-shaped section; the optical component is exposed on the second wedge-shaped section; the second wedge-shaped section is set away from the light source; the connection part is rotatably connected to the regulating part;

and the rotation axis of the connection part is parallel to a height direction of the second wedge-shaped section.

14. The irradiation angle adjustment component according to claim 1, wherein the fixing part is provided with a third spherical surface, which is offset from the optical component;

the regulating part is provided with a fourth spherical surface, which is offset from the light source; and the fourth spherical surface is attached to the third spherical surface, so that the regulating part is movable relative to the fixing part.

15. The irradiation angle adjustment component according to claim 14, wherein the regulating part is provided with a beam channel; the light passes through the beam channel; the fourth spherical surface is an annular concave spherical surface, which is located on an inner wall of the regulating part and communicates with the beam channel;

the fixing part is an annular fixing part; the third spherical surface is an annular convex spherical surface, which is located on an outer wall of the annular fixing part and is in contact with the annular concave spherical surface; the annular fixing part is rotatably connected to the fixing part with a center of the sphere of the annular convex spherical surface as a rotation point; the optical component is connected to an inner wall of the annular fixing part; and the optical component is sealed in the beam channel.

16. The irradiation angle adjustment component according to claim 15, wherein the regulating part and the fixing part are magnetically connected; or, the fixing part is snap-fitted to the regulating part.

17. The irradiation angle adjustment component according to claim 1, wherein the optical component comprises a lens.

18. The irradiation angle adjustment component according to claim 17, wherein the optical component comprises a honeycomb grid and/or an accessory ring; the lens, the honeycomb grid and the accessory ring are stacked in sequence, and the honeycomb grid and the accessory ring are both located on a side of the lens away from the light source.

19. An angle-adjustable luminaire, comprising a drive power supply and an illumination angle adjustment component according to claim 1, wherein the drive power supply is electrically connected to the light source.

* * * * *